United States Patent
Matsumura

(10) Patent No.: US 7,418,249 B2
(45) Date of Patent: Aug. 26, 2008

(54) RADIO APPARATUS

(75) Inventor: Takashi Matsumura, Kanagawa (JP)

(73) Assignee: Kyocera Corporation, Fushimi-ku, Kyoto-Shi, Kyoto (JP)

( * ) Notice: Subject to any disclaimer, the term of this patent is extended or adjusted under 35 U.S.C. 154(b) by 446 days.

(21) Appl. No.: 10/780,531

(22) Filed: Feb. 17, 2004

(65) Prior Publication Data

US 2004/0229570 A1 Nov. 18, 2004

(30) Foreign Application Priority Data

| Feb. 17, 2003 | (JP) | ............................ P2003-038901 |
| Feb. 17, 2003 | (JP) | ............................ P2003-038902 |
| Feb. 17, 2003 | (JP) | ............................ P2003-038903 |

(51) Int. Cl.
*H04B 17/00* (2006.01)

(52) U.S. Cl. .................. 455/226.4; 455/67.11; 455/296; 375/225

(58) Field of Classification Search ... 455/226.1–226.4, 455/296, 67.11; 375/225
See application file for complete search history.

(56) References Cited

U.S. PATENT DOCUMENTS

| 6,035,183 | A  | * | 3/2000  | Todd et al. ............... 455/226.2 |
| 6,426,971 | B1 | * | 7/2002  | Wu et al. ..................... 375/227 |
| 6,463,105 | B1 | * | 10/2002 | Ramesh ..................... 375/262 |
| 6,668,159 | B1 | * | 12/2003 | Olofsson et al. ......... 455/67.11 |
| 6,847,809 | B2 | * | 1/2005  | Gurelli et al. ............ 455/226.3 |

FOREIGN PATENT DOCUMENTS

| CN | 1123976 A  | 6/1996 |
| JP | 2002-300644 | 10/2002 |
| JP | 2002-345048 | 11/2002 |

OTHER PUBLICATIONS

Japanese Office Action dated Aug. 7, 2007 and its English translation.
Japanese Office Action dated Feb. 15, 2008 with English translation.

\* cited by examiner

*Primary Examiner*—Edward Urban
*Assistant Examiner*—Adeel Haroon
(74) *Attorney, Agent, or Firm*—Schulte Roth & Zabel LLP; John C. Garces

(57) ABSTRACT

A demodulator demodulates a received signal. A decoder performs inverse-spread spectrum processing on a demodulated signal. The decoder calculates a CIR value and outputs it to a CPU and a predictor. The predictor derives a next CIR value of the next reception time slot from the CIR value. The next CIR value is converted into a DRC with using a CIR-DRC conversion table. The CPU processes reception data internally or supplies those data to an externally connected PC via an external IF unit. The CPU determines, on the basis of the CIR value, a communication quality index of which to inform a user, and causes a display unit to display the index by an antenna mark. The index is supplied to the external PC via the external IF unit. Therefore, the user can recognize the communication quality by referencing to the index which indicates variation of the radio environment.

26 Claims, 17 Drawing Sheets

FIG. 3

| CIR (dB) | DRC (kbps) |
|---|---|
| -12.5 | 38.4 |
| -9.5 | 76.8 |
| -8.5 | 102.6 |
| -6.5 | 153.6 |
| -5.7 | 204.8 |
| -4.0 | 307.2 |
| -1.0 | 614.4 |
| 1.3 | 921.6 |
| 3.0 | 1228.8 |
| 7.2 | 1843.2 |
| 9.5 | 2457.6 |

FIG. 5
| TRANSMISSION POWER VALUE (dBm) | [TRANSMISSION POWER VALUE] - [MAXIMUM TRANSMISSIBLE POWER VALUE] (dB) | INDEX VALUE |
|---|---|---|
| +22.5— | —-0.5 | 0 |
| +21.5—+22.5 | 0.5—1.5 | 1 |
| +20.5—+21.5 | 1.5—2.5 | 2 |
| +3.5—+4.5 | 18.5—19.5 | 19 |
| —+3.5 | 19.5— | 20 |
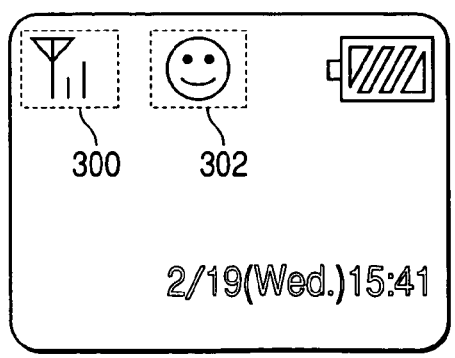
FIG. 6A
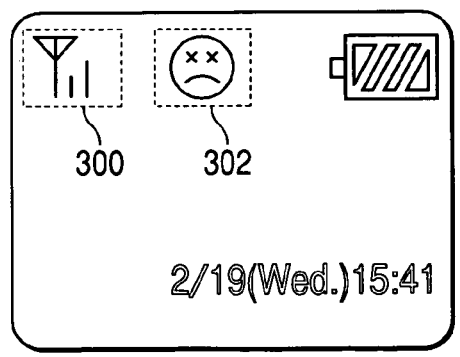
FIG. 6B

FIG. 7

| LED INDICATION | OFF | FLASHING (1) | FLASHING (2) | ON |
|---|---|---|---|---|
| COMMUNICATION RATE INDEX | OUT OF RANGE | SLOW (LOWER THAN 500 kbps) | MEDIUM (500 kbps TO 1 Mbps) | FAST (HIGHER THAN 1 Mbps) |
| RELIABILITY INDEX | OUT OF RANGE | LOW | MEDIUM | HIGH |

FIG. 14

| TRANSMISSION POWER VALUE (dBm) | [TRANSMISSION POWER VALUE] - [MAXIMUM TRANSMISSIBLE POWER VALUE] (dB) | CORRECTION VALUE (dB) |
|---|---|---|
| +22.5— | —0.5 | -20 |
| +22.0—+22.5 | 0.5—1.0 | -19 |
| +21.5—+22.0 | 1.0—1.5 | -18 |
| +13.0—+13.5 | 9.5—10.0 | -1 |
| —+13.0 | 10— | 0 |

FIG. 15A
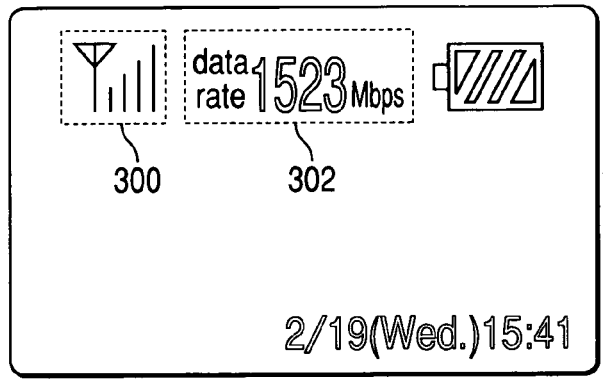
FIG. 15B
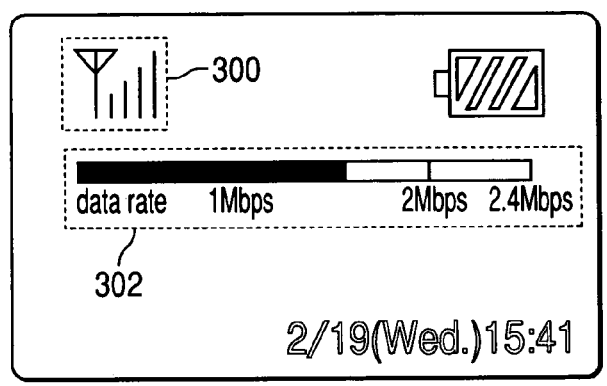
FIG. 16
| LED INDICATION | OFF | FLASHING (1) | FLASHING (2) | ON |
|---|---|---|---|---|
| COMMUNICATION RATE INDEX | OUT OF RANGE | SLOW (LOWER THAN 500 kbps) | MEDIUM (500 kbps TO 1 Mbps) | FAST (HIGHER THAN 1 Mbps) |

FIG. 17

| RECEPTION POWER VALUE (dBm) | [RECEPTION POWER VALUE] - [MINIMUM RECEIVABLE POWER VALUE] (dB) | CORRECTION VALUE (dB) |
|---|---|---|
| —103.0 | —1.0 | -10 |
| -103.0—-102.0 | 1.0—2.0 | -9 |
| -102.0—-101.0 | 2.0—3.0 | -8 |
| | | |
| -95.0—-94.0 | 9.0—10.0 | -1 |
| -94.0— | 10— | 0 |

FIG. 19

| DRC VALUE | COMMUNICATION RATE (kbps) | PACKET LENGTH (Slots) |
|---|---|---|
| 0x0 | NULL RATE | N/A |
| 0x1 | 38.4 | 16 |
| 0x2 | 76.8 | 8 |
| 0x3 | 153.6 | 4 |
| 0x4 | 307.2 | 2 |
| 0x5 | 307.2 | 4 |
| 0x6 | 614.4 | 1 |
| 0x7 | 614.4 | 2 |
| 0x8 | 921.6 | 2 |
| 0x9 | 1228.8 | 1 |
| 0xa | 1228.8 | 2 |
| 0xb | 1843.2 | 1 |
| 0xc | 2457.6 | 1 |
| 0xd | INVALID | N/A |
| 0xe | INVALID | N/A |
| 0xf | INVALID | N/A |

RADIO APPARATUS

CROSS-REFERENCE TO RELATED APPLICATIONS

This application claims all rights of priority to Japanese Patent Applications Serial Nos. P2003-038901, filed Feb. 17, 2003 (pending), P2003-038902, filed Feb. 17, 2003 (pending), and P2003-038903, filed Feb. 17, 2003

BACKGROUND OF THE INVENTION

1. Field of the Invention

The present invention relates to a radio apparatus configured to control variable communication rate. In particular, the present invention relates to a radio apparatus which controls the rate such that the communication rate is varied in accordance with variation of the environment.

2. Description of the Related Art

Recently, cdma2000 1x-EV DO (hereinafter referred to as EV-DO) has been developed as a next-generation high-rate wireless communication system. The EV-DO system is a new version, which is specialized for the purpose of data communication and is higher in transmission rate, compared to the cdma2000 1x system, which is an extended version (third generation system) of the cdmaOne system. "EV" stands for "evolution", and "DO" stands for "data only".

The EV-DO system is approximately the same as the cdma2000 1x system in the configuration of a radio interface of an upstream channel from a radio communication terminal to a base station. As for the configuration of the radio interface of a downstream channel from a base station to a radio communication terminal, whereas the bandwidth of 1.23 MHz is the same with that of the cdma2000 1x system, the modulation method and the multiplexing method are much different from those of the cdma2000 1x system. As for the modulation method, whereas QPSK and HPSK are used in the cdma2000 1x system, QPSK, 8-PSK, or 16QAM is selectively used in the EV-DO system according to a reception state of a downstream channel of a radio communication terminal. As a result, a high transmission rate with low error resistance is used when the reception state is good, and a low transmission rate with high error resistance is used when the reception state is bad.

As for the multiplexing method for enabling multiple communications from one base station to a plurality of radio communication terminals, TDMA (Time Division Multiple Access) is employed in EV-DO system. In such system, communications with a plurality of radio communication terminals are performed in such a manner that time is divided in units of 1/600 second, a communication is performed with one radio communication terminal in each unit time, and the radio communication terminal to be communicated is switched every unit time, rather than CDMA (Code Division Multiple Access) which is employed in the cdmaOne system and the cdma2000 1x system.

A radio communication terminal measures a carrier-to-interference power ratio (hereinafter abbreviated as CIR) of a pilot signal as an index of a reception state of a downstream channel from a base station to be communicated, predicts a reception state during the next reception time slot on the basis of a variation of the CIR, and notify "a maximum transmission rate which enables to receive with a error ratio that is lower than a predetermined rate", which is expected from the predicted reception state to the base station as data rate control bits (hereinafter referred to as DRC) predetermined. The predetermined error rate is usually set to about 1% though it depends on the system design. The base station receives the DRCs from a plurality of radio communication terminals, and a scheduler function in the base station determines with which radio communication terminal is to communicate in each division unit time. Basically, as high a transmission rate as possible is decided on the basis of a DRC sent from each radio communication terminal and is used for a communication with it.

With the above configuration, the EV-DO system enables a maximum transmission rate of 2.4 Mbps (mega-bits per second) per sector in a downstream channel. This transmission rate is the sum of amounts of data communications from one base station to a plurality of radio communication terminals in one frequency band and in one of a plurality of sectors (usually, a plurality of sectors exist). The transmission rate increases if a plurality of frequency bands are used.

JP-A-2002-300644 is known as a related art.

As described above, in the EV-DO system, the transmission rate of a downstream channel depends on the reception state of a radio communication terminal. Although the reception state is as high as 2.4 Mbps in the best reception state in a stationary state, it is about 500 to 700 kbps on average in a state that a radio communication terminal is moving at a middle or high speed with a vehicle and is as low as tens of kilo-bits per second in a bad reception state in a stationary state. Therefore, even when the user of a radio communication terminal is moving at a low speed (i.e., walking) or almost stands still, the transmission rate depends on the location and may decrease to a large extent. To prevent the condition by user's operation so-called antenna mark is displayed and an alarm sound is generated in order to notify the user of the reception state in conventional cellular phones. For example, cellular phones which uses cdmaOne system notify users of a reception state on the basis of Ec/Ic (energy per chip to the total input power).

However, in the EV-DO system, the transmission rate of a downstream channel is influenced by not only the CIR instantaneous value but also a correction using statistical data such as predictive or past data transmission error rates in downstream channels. Therefore, an error may be contained under a reception state decided on the basis of only a CIR. Further, in EV-DO cellular phones, the variation of the transmission rate due to a reception state variation is larger than that in PDC (Personal Digital Cellular) and cdmaOne cellular phones. Therefore, in the EV-DO system, it is required that a reception state is measured with higher accuracy.

On the other hand, in the EV-DO system, the upstream channel transmission power of a radio communication terminal is controlled by a base station as is the case with the cdma2000 1x system. The maximum transmission power is limited to +23 dBm (200 mW) to +24 dBm (about 250 mW) by regulations etc. A base station instructs, whenever necessary, each radio communication station to increase or decrease the transmission power so that the transmission power of each radio communication station is kept almost constant or satisfies desired quality. According to such an instruction, each radio communication station adjusts the transmission power in a range below the above-mentioned maximum transmission power. When a radio communication terminal is located away from a base station and it is hard for an upstream channel signal to reach the base station, the base station instructs the radio communication terminal to increase the transmission power. However, if the transmission power of the radio communication station has reached the maximum transmission power, the radio communication station cannot increase the transmission power any more. The DRC of the upstream channel does not reach the base station. As a result, downstream channel data transmission can no longer be performed.

In radio communication terminals, a demodulator has an AGC (automatic gain control). The transmission rate depends on only the CIR, and is not generally influenced by the reception signal power in an AGC operating range. On the other hand, if the reception signal power becomes lower than the AGC operating range, the CIR steeply decreases and a downstream channel signal can no longer be received.

The transmission rate per sector is shared by all the radio communication terminals that exist in the sector and are connected to the base station. Therefore, the transmission rate that can be used by each radio base station is varied to a large extent by the communication states according to the other radio communication terminals. When a plurality of radio base stations exist in one sector and are communicating with the base station, the allocation of downstream channel transmission rates of the respective radio communication terminals is determined by a scheduler in the base station. Although no scheduler algorithm is defined in the standard, an algorithm called "proportional fair" is generally considered effective in terms of the fairness of provision of transmission rates to respective radio communication terminals and the improvement of the sector transmission rate.

According to the proportional fair algorithm, DRC/R is calculated on the basis of amounts R of data that have just been sent from the base station to the respective radio communication terminals in 1.67 s (corresponds to 1,000 slots) and DRC values that are requested by the respective radio communication terminals. A slot is allocated to a radio communication terminal having a largest DRC/R value. With this scheduler processing, an actual transmission rate is not necessarily equal to a transmission rate that a radio communication terminal requests the base station to allocate using a DRC. In general, the actual transmission rate is lower than the transmission rate that a radio communication terminal requests using the DRC. Therefore, if a DRC itself is used as an index of the reception state, it is insufficient because the presence of the other radio communication terminals is not taken into consideration.

SUMMARY OF THE INVENTION

An object of the invention is to provide a radio apparatus which notifies a user of an index regarding communication quality. Another object of the invention is to provide a radio apparatus which outputs the index regarding the communication quality. Further object of the invention is to provide a radio apparatus which derives an index of communication quality that is suitable for a communication system in which the data communication rate varies to a large extent according to a signal reception state and a communication may also be disconnected by other factors.

According to one aspect of the invention, a radio apparatus is provided. This ratio apparatus has a receiving unit for receiving a signal; a measuring unit for measuring a quality of the received signal; a predicting unit for predicting a quality of a signal to be received based on the quality of the received signal being previously measured by the measuring unit; and a judging unit for judging a probability of continuation of a communication based on the predicted quality of the signal to be received and the measured quality of the received signal. The quality of the received signal and the quality of the signal to be received may be characterized by a carrier-to-interference power ratio.

According to another aspect of the invention, a radio apparatus is provided. This radio apparatus has a receiving unit for receiving a signal transmitted from a base station apparatus at a variable communication rate; a measuring unit for measuring a quality of the received signal; an estimating unit for deriving a first prediction value of a communication rate of a signal being transmitted from the base station apparatus in future, based on the quality of the received signal being previously measured by the measuring unit; an index calculating unit for calculating an index value based on the measured quality of the received signal; a calculating unit for calculating a second prediction value of the communication rate based on the index value and the first prediction value; and a notifying unit for notifying the index value and the second prediction value. The quality of the received signal may be characterized by a carrier-to-interference power ratio.

According to another aspect of the invention, a radio apparatus is provided. This radio apparatus has a receiving unit for receiving a signal transmitted from a base station apparatus at a variable communication rate; a measuring unit for measuring a quality of the received signal; an estimating unit for deriving a first prediction value of a communication rate of a signal being transmitted from the base station apparatus in future, based on the quality of the received signal being previously measured by the measuring unit; a detecting unit for detecting a power value based on the received signal; a power index calculating unit for calculating an index value based on a preset reference value and the detected power value; a calculating unit for calculating a second prediction value of the communication rate based on the index value and the first prediction value; and a notifying unit for notifying the index value and the second prediction value. The quality of the received signal may be characterized by a carrier-to-interference power ratio.

According to still another aspect of the invention, a radio apparatus is provided. This radio apparatus has a receiving unit for receiving a signal transmitted from a base station apparatus at a variable communication rate; a measuring unit for measuring a quality of the received signal; an estimating unit for deriving a first prediction value of a communication rate of a signal being transmitted from the base station apparatus in future, based on the quality of the received signal being previously measured by the measuring unit; an index calculating unit for calculating a first index value based on the measured quality of the received signal; a detecting unit for detecting a power value based on the received signal; a power index calculating unit for calculating a second index value based on a preset reference value and the detected power value; a calculating unit for calculating a second prediction value of the communication rate based on the second index value and the first prediction value; and a notifying unit for notifying the first index value and the second prediction value. The quality of the received signal may be characterized by a carrier-to-interference power ratio.

According to a further aspect of the invention, a radio apparatus is provided. This radio apparatus has a receiving unit for receiving a signal transmitted from a base station apparatus at a variable communication rate; a measuring unit for measuring a quality of the received signal; an estimating unit for deriving a first prediction value of a communication rate of a signal being transmitted from the base station apparatus in future, based on the quality of the received signal being previously measured by the measuring unit; an index calculating unit for calculating a first index value based on the measured quality of the received signal; a detecting unit for detecting a power value based on the received signal; a power index calculating unit for calculating a second index value based on a preset reference value and the detected power value; a calculating unit for calculating a second prediction value of the communication rate based on the first index value and the first prediction value; and a notifying unit for notifying the second index value and the second prediction value. The quality of the received signal may be characterized by a carrier-to-interference power ratio.

The radio apparatus may be such that the detecting unit detects a reception power value of the received signal as the power value, and the power index calculating unit sets a minimum receivable power value as the reference value and calculates the index value based on the minimum receivable power value and the reception power value. Alternatively, the radio apparatus may be such that the detecting unit detects a transmission power value as the power value from an instruction information included in the received signal, and the power index calculating unit sets a maximum transmissible power value as the reference value and calculates the index value based on the maximum transmissible power value and the transmission power value.

According to another aspect of the invention, a radio apparatus is provided. This radio apparatus has a receiving unit for receiving a signal transmitted from a base station apparatus at a variable communication rate; a reception power detecting unit for detecting a reception power value of the received signal; a first index calculating unit for calculating a first index value based on the detected reception power value and a minimum receivable power value; a transmission power detecting unit for detecting a transmission power value from an instruction information included in the received signal; a second index calculating unit for calculating a second index value based on the detected transmission power value and a maximum transmissible power value; a measuring unit for measuring a quality of the received signal; an estimating unit for deriving a first prediction value of a communication rate of a signal being transmitted from the base station apparatus in future, based on the measured quality of the received signal; a calculating unit for calculating a second prediction value of the communication rate based on the first index value and the first prediction value; and a notifying unit for notifying the second index value and the second prediction value. The quality of the received signal may be characterized by a carrier-to-interference power ratio.

According to another aspect of the invention, a radio apparatus is provided. This radio apparatus has a receiving unit for receiving a signal transmitted from a base station apparatus at a variable communication rate; a reception power detecting unit for detecting a reception power value of the received signal; a first index calculating unit for calculating a first index value based on the detected reception power value and a minimum receivable power value; a transmission power detecting unit for detecting a transmission power value from an instruction information included in the received signal; a second index calculating unit for calculating a second index value based on the detected transmission power value and a maximum transmissible power value; a measuring unit for measuring a quality of the received signal; an estimating unit for deriving a first prediction value of a communication rate of a signal being transmitted from the base station apparatus in future, based on the measured quality of the received signal; a calculating unit for calculating a second prediction value of the communication rate based on the second index value and the first prediction value; and a notifying unit for notifying the first index value and the second prediction value. The quality of the received signal may be characterized by a carrier-to-interference power ratio.

According to another aspect of the invention, a radio apparatus is provided. This radio apparatus has a receiving unit for receiving a signal as a processing subject; a measuring unit for measuring a carrier-to-interference power ratio of the received signal; a predicting unit for calculating a carrier-to-interference power ratio prediction value based on a carrier-to-interference power ratio being previously measured by the measuring unit; and a judging unit for judging a probability of continuation of a communication in accordance with a difference between a prediction value of the carrier-to-interference power ratio and the measured signal to interference power ratio.

The above apparatus can estimate the magnitude of variation of the communication environment by comparing an actually measured carrier-to-interference power ratio with a predicted one carrier-to-interference power ratio.

According to another aspect of the invention, a radio apparatus is provided. This radio apparatus has a receiving unit for receiving a signal transmitted from a base station apparatus at a variable communication rate; a measuring unit for measuring a carrier-to-interference power ratio of the received signal; a detecting unit for detecting a predetermined power value based on the received signal; an estimating unit for deriving a prediction value of a communication rate of a signal being transmitted from the base station apparatus in future, based on the measured carrier-to-interference power ratio; and a calculating unit for calculating a value indicating reliability of the prediction value in accordance with a difference between a preset reference value and the detected power value.

The radio apparatus may be such that the signal transmitted from the base station apparatus at a variable communication rate includes an instruction information relating to a transmission power when the radio apparatus transmits a signal to the base station apparatus, the detecting unit detects a power value of a signal to be transmitted as a predetermined power value from the instruction information relating to a transmission power included in the received signal, and the calculating unit sets a maximum transmissible power value as the reference value and calculates a value indicating a reliability of the prediction value in accordance with a difference between the maximum transmissible power value and the power value of the signal to be transmitted.

"The instruction information relating to a transmission power" may be any information including direct information which indicates a transmission power value or indirect information which indicates an increase or decrease from a current transmission power value and finally enables determination of a transmission power value.

Alternatively, the radio apparatus may be such that the detecting unit detects a power value of the received signal as a predetermined power value from the received signal, and the calculating unit sets a minimum receivable power value as the reference value and calculates a value indicating a reliability of the prediction value in accordance with a difference between the minimum receivable power value and the power value of the received signal.

According to the above apparatus, since not only the prediction value but also the value indicating the reliability of the prediction value is calculated, it is possible to provide more detailed information about the prediction value.

According to a further aspect of the invention, a radio apparatus is provided. This radio apparatus has a receiving unit for receiving a signal transmitted from a base station apparatus at a variable communication rate; a measuring unit for measuring a carrier-to-interference power ratio of the received signal; an estimating unit for deriving a prediction value of a communication rate of a signal being transmitted from the base station apparatus in future, based on the measured carrier-to-interference power ratio; a predicting unit for calculating a prediction value of a carrier-to-interference power ratio based on a carrier-to-interference power ratio being previously measured by the measuring unit; and a calculating unit for calculating a value indicating a reliability of the prediction value in accordance with a difference between the prediction value of the carrier-to-interference power ratio and the measured carrier-to-interference power ratio.

According to the above apparatus, since not only the prediction value but also the value indicating the reliability of the prediction value and corresponding to the magnitude of variation of the communication environment is calculated, it is possible to provide information about the probability of variation of the prediction value.

The radio apparatus may further have a notifying unit for notifying a user of the prediction value of the communication rate of the signal being transmitted from the base station apparatus in future and the value indicating the reliability of the prediction value, or an output unit for outputting the prediction value and the value indicating the reliability of the prediction value.

According to another aspect of the invention, a radio apparatus is provided. This radio apparatus has a receiving unit for receiving a signal transmitted from a base station apparatus; a measuring unit for measuring a quality of the received signal; a detecting unit for detecting a power value based on the received signal; a calculating unit for calculating a correction value based on a preset reference value and the detected power value; and a correcting unit for correcting the measured quality of the received signal by using the calculated correction value.

The radio apparatus may be such that the signal transmitted from the base station apparatus includes an instruction information relating to a transmission power when the radio apparatus transmits a signal to the base station apparatus; the detecting unit detects a transmission power value of a signal to be transmitted as a predetermined power value from the instruction information relating to the transmission power included in the received signal; and the calculating unit sets a maximum transmissible power value as the reference value and calculates the correction value based on the maximum transmissible power value and the transmission power value of the signal to be transmitted. Alternatively, the detecting unit detects a reception power value of the received signal as the predetermined power value; and the calculating unit sets a minimum receivable power value as the reference value and calculates the correction value based on the minimum receivable power value and the reception power value of the received signal. Alternatively, the calculating unit sets the correction value to zero if the detected power value is out of a predetermined range.

"The instruction information relating to a transmission power" may be any information including direct information which indicates a transmission power value or indirect information which indicates an increase or decrease from a current transmission power value and finally enables determination of a transmission power value.

The radio apparatus may be such that a communication rate of the signal transmitted front the base station apparatus is variable, the radio apparatus further has: an estimating unit for deriving a prediction value of a communication rate of a signal being transmitted from the base station apparatus in future, based on the corrected quality of the received signal; and a notifying unit for notifying a user of the prediction value. Alternatively, the radio apparatus may be such that a communication rate of the signal transmitted from the base station apparatus is variable, the radio apparatus further has: an estimating unit for deriving a prediction value of a communication rate of a signal being transmitted from the base station apparatus in future, based on the corrected quality of the received signal; and an output unit for outputting the prediction value. The quality of the received signal may be a carrier-to-interference power ratio.

According to the above apparatus, since the prediction value of the communication rate is derived after an actually measured quality of the received signal is corrected by using a correction value based on a transmission power value or a reception power value, it is possible to increase the accuracy of the communication rate prediction value.

According to another aspect of the invention, a radio apparatus is provided. This radio apparatus has a receiving unit for receiving a signal transmitted from a base station apparatus at a variable communication rate; an interference measuring unit for measuring a quality of the received signal; an estimating unit for deriving a prediction value of a communication rate of a signal being transmitted from the base station apparatus in future, based on the measured quality of the received signal; a storing unit for storing the prediction value; a rate measuring unit for measuring an actual communication rate value of the received signal; a calculating unit for calculating a signal occupation ratio based on the measured actual communication rate value and a prediction value corresponding to the measured actual communication rate value among prediction values stored in the storing unit; and a correcting unit for correcting the prediction value by using the signal occupation ratio.

In general, the term "signal occupation ratio" means the ratio of a bandwidth occupied by a signal that is used for a communication with respect to a communication-possible bandwidth. No particular limitations are imposed on the parameter that is used for defining the signal occupation ratio. Examples of the signal occupation ratio are a packet occupation ratio and a slot occupation ratio.

The calculating unit calculates the signal occupation ratio by performing statistical processing for a ratio between the measured actual communication rate value and a prediction value corresponding to the measured actual communication rate value among prediction values stored in the storing unit in a past predetermined period. The correcting unit multiplies the prediction value by the signal occupation ratio. The radio apparatus may further have a notifying unit for notifying a user of the corrected prediction value, an output unit for outputting the corrected prediction value. The quality of the received signal may be a carrier-to-interference power ratio.

"The multiplication" is not limited to actual multiplication and includes processing that produces a result that is equivalent to a result of actual multiplication, such as conversion using a table.

According to the above apparatus, since the prediction value of the communication rate is derived after an actually measured quality of the received signal is corrected by using a correction value based on a signal occupation ratio, it is possible to increase the accuracy of the prediction value of the communication rate by taking scheduling processing by the base station apparatus into consideration.

An arbitrary combination of the above-described elements and results of conversion of an expression of the invention into a method, apparatus, system, recording medium, computer program, etc. are effective as other forms of the invention.

BRIEF DESCRIPTION OF THE DRAWINGS

The invention is illustrated by way of example and not limitation and the figures of the accompanying drawings in which like references denote like or corresponding parts, and in which:

FIG. 3 shows the details of a CIR-DRC conversion table shown in FIG. 2;

FIG. 5 shows a conversion table for conversion into a reliability index;

FIGS. 6A and 6B show examples of pictures to be displayed on a display unit shown in FIG. 2;

FIG. 7 shows LED lighting patterns of the display unit shown in FIG. 2;

FIG. 14 is a table of correspondence between the transmission power value and the correction value according to the seventh embodiment of the invention;

FIGS. 15A and 15B show examples of the pictures to be displayed on the display unit shown in FIG. 2 according to the seventh embodiment of the invention;

FIG. 16 shows LED lighting patterns of the display unit shown in FIG. 2 according to the seventh embodiment of the invention;

FIG. 17 is a table of correspondence between the reception power value and the correction value according to an eighth embodiment of the invention;

FIG. 19 is a table showing a relationship between the DRC and the packet length.

DETAILED DESCRIPTION OF THE PREFERRED EMBODIMENTS AND THE DRAWINGS

First Embodiment

A first embodiment relates to a communication system using the above-described cdma2000 1xEV-DO system in which communication quality indices are displayed to notify the user of a communication state. In this embodiment, in addition to a communication rate index, an index indicating the reliability of the communication rate index (hereinafter referred to as reliability index) is also displayed as another communication quality index, so that a user can recognize a communication state more surely. The communication rate index is derived from a CIR corresponding to a DRC. On the other hand, the reliability index is derived from the difference between a maximum transmissible power value of a terminal apparatus and a current transmission power value of the terminal apparatus. When the current transmission power value of the terminal apparatus is equal to the maximum transmissible power value, the terminal apparatus cannot increase the transmission power even if the terminal apparatus was instructed to increase the transmission power by a base station apparatus. Therefore, the base station apparatus cannot obtain a necessary reception power, so that a communication on an upstream channel becomes more prone to be disconnected. That is, if the reliability is low, the probability of communication rate reduction is high.

Figure 1:
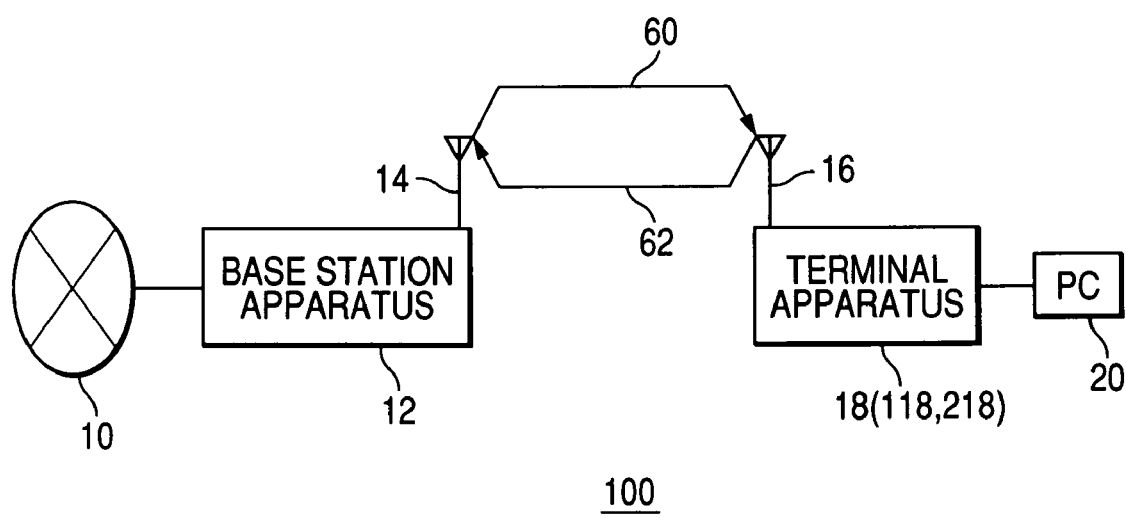
FIG. 1 shows the configuration of a communication system according to a first embodiment of the invention.

FIG. 1 shows a communication system 100 of the first embodiment. The communication system 100 includes a network 10, a base station apparatus 12, a base station antenna 14, a terminal antenna 16, a terminal apparatus 18, and a PC 20.

The terminal apparatus 18 is used by a user singly or in a state that it is connected to the PC 20. The terminal apparatus 18 has the terminal antenna 16.

The base station apparatus 12 is connected to the network 10, and a connection is established with the terminal apparatus 18. Although FIG. 1 shows a single terminal apparatus 18 is connected to the base station apparatus 12, a plurality of the terminal apparatus 18 may be connected to the base station apparatus 12. The base station apparatus 12 has the base station antenna 14.

Signals are transmitted from the base station apparatus 12 to the terminal apparatus 18 through a downstream channel 60, and signals are transmitted from the terminal apparatus 18 to the base station apparatus 12 through an upstream channel 62. Control signals including a pilot signal and a transmission power instruction signal and a data signal are transmitted through the downstream channel 60. On the other hand, a DRC, a data signal, etc. are transmitted through the upstream channel 62.

Figure 2:
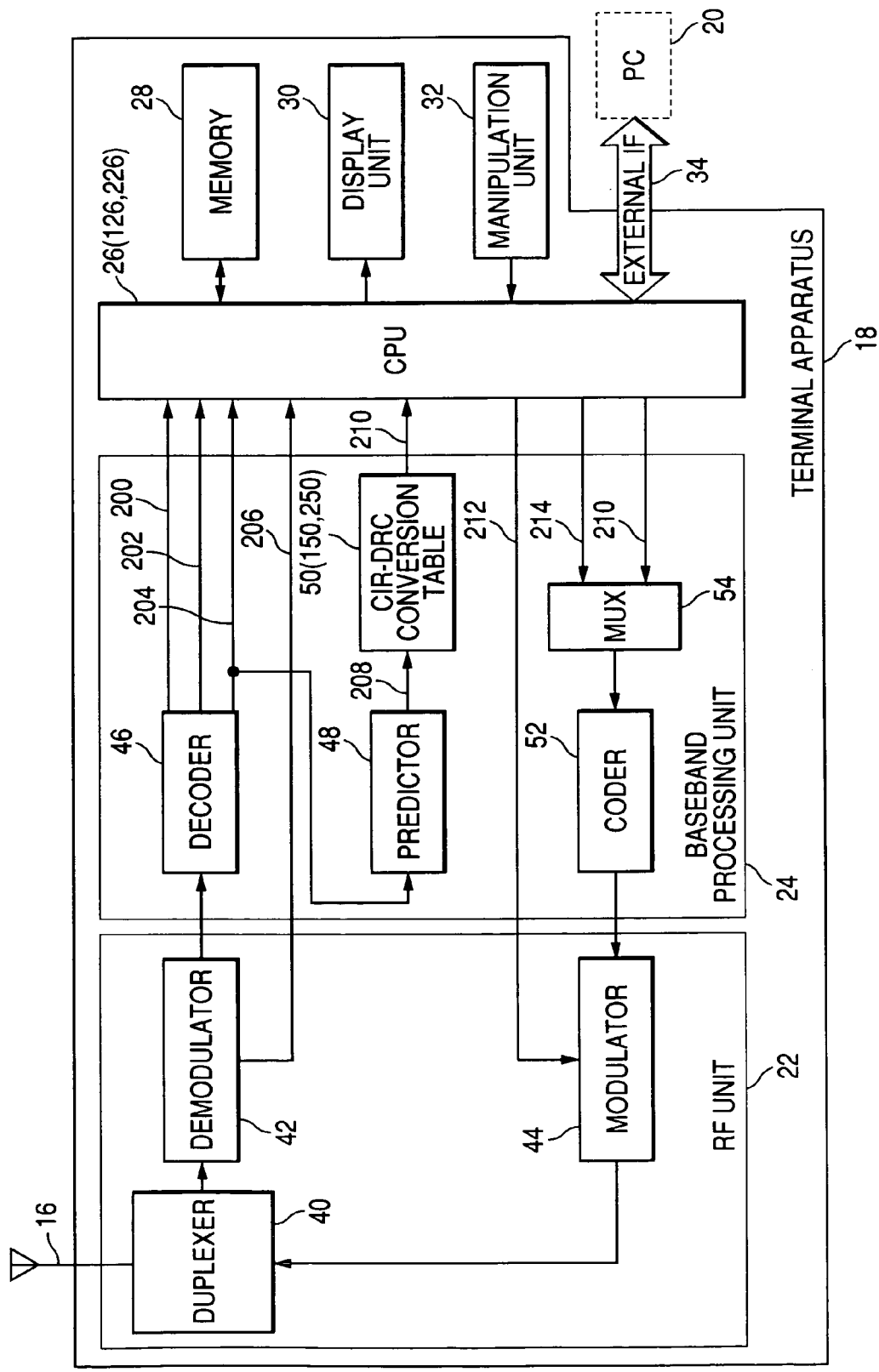
FIG. 2 shows the configuration of a terminal apparatus shown in FIG. 1.

FIG. 2 shows the configuration of the terminal apparatus 18. The terminal apparatus 18 includes an RF unit 22, a baseband processing unit 24, a CPU 26, a memory 28, a display unit 30, a manipulation unit 32, and an external 1F unit 34. The RF unit 22 includes a duplexer 40, a demodulator 42, and a modulator 44. The baseband processing unit 24 includes a decoder 46, a predictor 48, a CIR-DRC conversion table 50, a coder 52, and an MUX 54.

The demodulator 42 demodulates a signal that is received via the terminal antenna 16 and the duplexer 40. It is assumed that the received signal is modulated by QPSK, 8PSK, or 16QAM. The demodulator 42 calculates a reception power value based on the received signal and outputs it to the CPU 26.

The decoder 46 performs inverse-spread spectrum processing for a demodulated signal. If there exist reception data 200 that are assigned to the terminal apparatus 18, the decoder 46 outputs the reception data 200 to the CPU 26. The decoder 46 extracts, from control signals, a transmission power instruction signal that indicates a transmission power specified by the base station apparatus 12, derives power control information 202 based on the transmission power instruction signal, and outputs it to the CPU 26. Further, the decoder 46 extracts a pilot signal from the control signals, calculates a CIR value 204 on the basis of the pilot signal, and outputs it to the CPU 26 and the predictor 48.

The predictor 48 derives a next CIR value 208 of the next reception slot based on the CIR value 204. No prediction method is clearly described in the standard, linear prediction may be employed, for example.

The next CIR value 208 is converted into a DRC 210 with using the CIR-DRC conversion table 50. FIG. 3 shows an example of the CIR-DRC conversion table 50, which is a citation from a document of Qualcomm Inc.: "CDMA/HDR: A Bandwidth-Efficient High-Speed Wireless Data Service for Nomadic Users," IEEE Communications Magazine, July 2000. The DRC may represent not a communication rate but a value corresponding to it.

The CPU 26 internally processes the reception data 200 or transmits the reception data 200 to the PC 20 that is connected to the terminal apparatus 18 via the external IF unit 34. The CPU 26 derives communication quality indices to inform the user on the basis of the DRC 210 and other data and display those on the display unit 30 in the form of an antenna mark etc. The indices may be transmitted to the external PC 20 via the external 1F unit 34 so that an application in the PC 20 such as moving picture transmission or VoIP can perform a QoS control on the basis of the indices. One example is that the request communication rate to be requested by using the DRC is decreased if the communication rate is decreasing. Another example is that the capacity of a communication data buffer is increased and a data signal is previously read if the reliability of the communication rate is lowering. Further, the CPU 26 processes the power control information 202 and determines a new transmission power value 212 by correcting the current one. The CPU 26 outputs a data signal, which is generated by the CPU 26 or is input from the PC 20 via the external 1F unit 34, as transmission data 214.

The MUX 54 multiplexes the transmission data 214 and the DRC 210. The coder 52 performs spread spectrum processing for a multiplexed signal. The modulator 44 modulates a spread spectrum signal, and a resulting signal is sent to the base station apparatus 12 via the duplexer 40 and the terminal antenna 16.

The above configuration can be implemented, in hardware form, by a CPU, a memory, and other LSIs of an arbitrary computer. And it can be implemented, in software form, by a program that has a reservation management function and is loaded into the memory 28, for example. The configuration of this embodiment includes the CPU 26, the baseband processing unit 24, the RF unit 22, etc. Therefore, it is it would be understood by a person skilled in the art that these functional blocks can be implemented by only hardware, only software, or a combination thereof.

Figure 4:
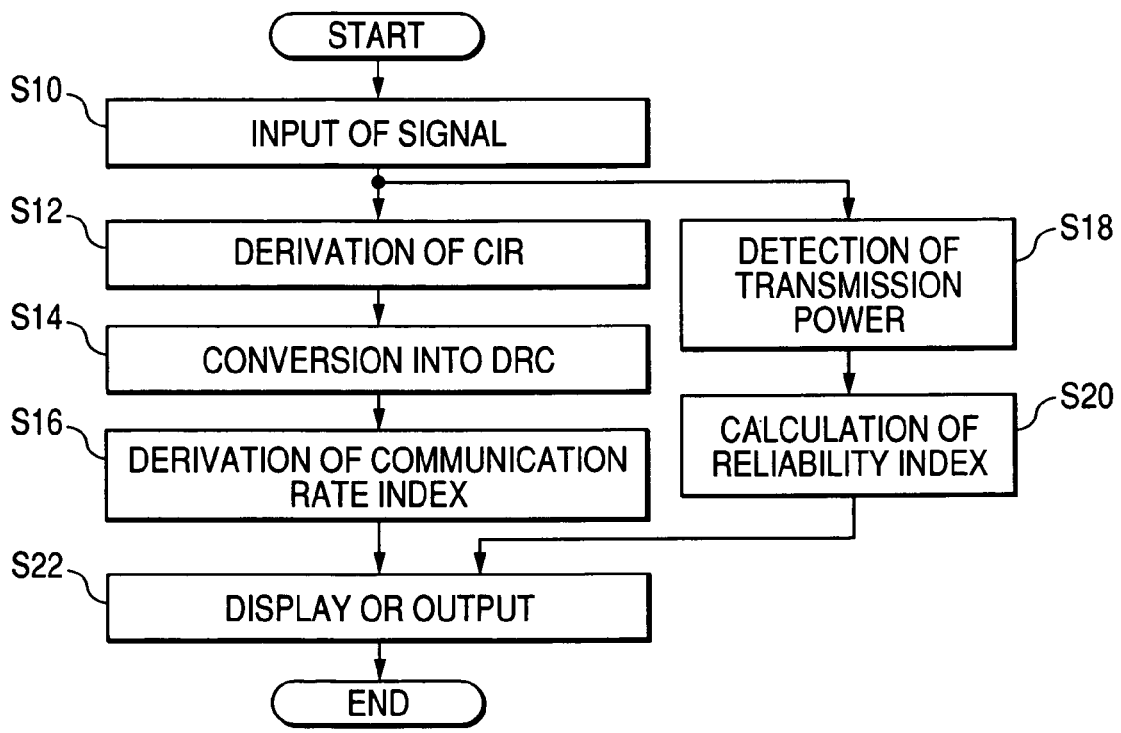
FIG. 4 is a flowchart of a process of deriving communication quality indices.

FIG. 4 is a flowchart of a process for deriving communication quality indices of the first embodiment. A signal is input to the demodulator 42 and then to the decoder 46 shown in FIG. 2 (S10). The decoder 46 derives a CIR value 204, and the predictor 48 derives a next CIR value 208 (S12). That is, the predictor 48 calculates a next CIR value 208 by predicting a CIR of the next reception time slot on the basis of the CIR value 204. The next CIR value 208 is converted into a DRC 210 with using the CIR-DRC conversion table 50 (S14). The decoder 46 detects power control information 202 (S18). The CPU 26 corrects a current transmission power value with using the power control information 202 to derive a transmission power value.

The CPU 26 derives a communication rate index from the DRC 210 (S16) and derives the reliability index from the power control information 202 (S20). In this embodiment, the communication rate index is the DRC value 210 (having no unit) itself that is a 4-bit value and corresponds to a communication rate, a communication rate (unit: bps) shown in FIG. 3, and the CIR value 204 (unit: dB) shown in FIG. 3, or a converted value obtained on the basis of one of these. The converted value is an integer obtained by dividing a dB value, for example, by −0.5 and dropping the fractional portion of a quotient or rounding it off to the nearer one of 1 and 0. For example, in the case of changing −23.9 dB to an integer, a calculation −23.9/(−0.5)=47.8 is made and 47.8 is rounded oft to 48, which is employed as an index. The reliability index is the difference (unit: dB) between a transmission power value (unit: dBm) and a maximum transmissible power value (unit: dBm) or a converted value of the difference. The maximum transmissible power value is set to 23 dBm, and a converted value is calculated in the same manner as described above. Alternatively, the reliability index may be derived by using the table shown in FIG. 5. For example, the reliability index is set to 20 when the reliability is high, that is, the above-mentioned difference is largest, and is set to 0 when the reliability is low.

The CPU 26 displays the communication rate index and the reliability index on the display unit 30, or outputs those via the external IF unit 34 (S22). FIGS. 6A and 6B show a display on the display unit 30. Antenna bars 300 indicate the communication rate index, and an icon 302 indicates the reliability index. FIG. 6A corresponds to a case that the communication rate index is low and the reliability index is high. FIG. 6B corresponds to a case that the communication rate index is high and the reliability index is low. Alternatively, the user may be notified of those indices by using LED lighting patterns shown in FIG. 7. The communication rate index and the reliability index are respectively indicated by separate LEDs of green and red, for example. Flashing (1) and flashing (2) are different from each other in that the on-duty factor is larger in flashing (2).

According to this embodiment, it is possible to directly provide a rough measure of the communication rate by using the DRC as the communication rate index. That is, since "the difference between the transmission power value and the maximum transmissible power value" is used as the reliability index, disconnection of a communication can be previously predicted. Such a disconnection will occur when the transmission power value is close to the maximum transmissible power value even under an environment that the reception state at the terminal apparatus 18 is good and a high communication rate is expected because both of CIR. and DRC are large. That is, the transmission power value will reach the maximum transmissible power value and, if the transmission power value is still insufficient, an upstream channel signal will not reach the base station apparatus 12.

Second Embodiment

As is the case of the first embodiment, a second embodiment relates to a communication system using the EV-DO system in which a communication rate index which indicates communication rate and a reliability index which indicates the reliability of the communication rate index are displayed as the communication quality indices. Whereas the index indicating the reliability index is derived on the basis of the transmission power value in the first embodiment, it is derived on the basis of the difference between a minimum receivable power value and a current reception power value of the terminal apparatus in the second embodiment. The communication rate depends on the CIR and is not influenced by the reception power value in an AGC operating range at the terminal apparatus. However, if the reception power value becomes lower than the AGC operating range, the CIR steeply decreases. Therefore, a communication on a downstream channel becomes more prone to be disconnected. That is, if the reliability index is low, the probability of communication rate reduction is high.

The terminal apparatus 18 shown in FIG. 2 is also effective in the second embodiment. The flowchart of the process of deriving communication quality indices is also effective in the second embodiment except for S18 and S20. At a step corresponding to S18, the demodulator 42 detects a reception power value 206. At a step corresponding to S20, the CPU 26 derives the reliability index from the difference (unit: dB) between the reception power value 206 (unit: dBm) and a minimum receivable power value (unit: dBm) or a converted value of the difference. Alternatively, the reliability index may be derived with using a table that is similar to the table of FIG. 5. The minimum receivable power value is previously set to a value suitable for the terminal apparatus 18.

According to this embodiment, since the difference between the reception power value and the minimum receivable power value is used to derive the reliability index, disconnection of a communication can be previously predicted. Such a disconnection will occur when the intensity of a downstream channel signal is close to a reception lower limit so that it cannot be received by the terminal apparatus 18.

Third Embodiment

As is the case of the first and second embodiments, a third embodiment relates to a communication system using the EV-DO system in which a communication rate index which indicates communication rate and a reliability index which indicates the reliability of the communication rate index are displayed as the communication quality indices. In the third embodiment, the reliability index is derived on the basis of the difference between a CIR that is measured in each time slot that occurs every 1/600 second and a predictive CIR that is obtained by using an arbitrary algorithm. In general, the difference is small in a stationary state in which the variation of the communication environment is small. On the other hand, the predictive CIR tends to be smaller than the CIR in a state that the terminal apparatus 18 is moving. The difference thus reflects occurrence/non-occurrence of a variation in the communication environment.

The terminal apparatus 18 shown in FIG. 2 is also effective in the third embodiment.

Figure 8:
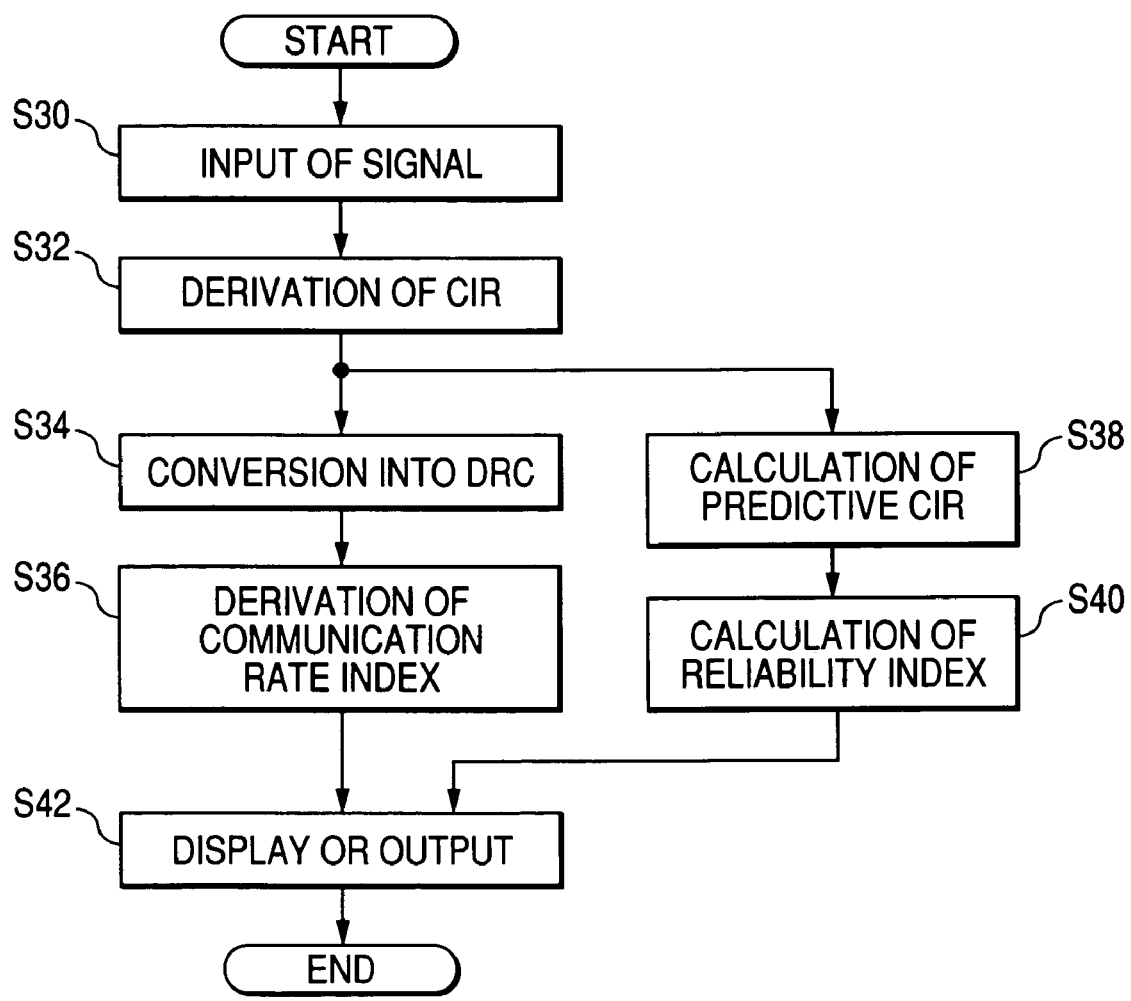
FIG. 8 is a flowchart of a process of deriving communication quality indices according to a third embodiment of the invention.

FIG. 8 is a flowchart of a process for deriving communication quality indices of the third embodiment. A signal is input to the demodulator 42 and then to the decoder 46 shown in FIG. 2 (S30). The decoder 46 derives a CIR value 204, and the predictor 48 derives a next CIR value 208 of the next reception time slot (S32). The next CIR value 208 is converted into a DRC 210 with using the CIR-DRC conversion table 50 (S34). The CPU 26 derives a communication rate index from the DRC 210 (S36). On the other hand, the CPU 26 calculates a predictive CIR value on the basis of the CIR value 204 (S38). For example, a predictive CIR value is calculated by extrapolation, for example, on the basis of past CIR values 204. The next CIR value 208 that has been calculated by the predictor 48 may be used instead of the predictive CIR value.

Further, the CPU 26 calculates a reliability index (S40). The relationship between the degree of variation of the communication environment and the difference between the CIR value 204 and the predictive CIR value depends on the algorithm that is used for the prediction. For example, a prediction algorithm in which the index value becomes equal to about 15 in a stationary state, about 10 in a low-speed moving state, and about 5 in a high-speed moving state is used. The CPU 26 displays the communication rate index and the reliability index on the display unit 30, or outputs those via the external IF unit 34 (S42). A more reliable communication rate obtained by correcting the communication rate index with using the reliability index may be displayed. An exemplary equation for that purpose is:

[downstream communication rate index]=[communication rate corresponding to DRC]×α where α is given as follows:

α=0,
if | difference between CIR value and predictive CIR value | ≧20 (dB); and

α=(20−| difference between CIR value and predictive CIR value |)×0.05,
if | difference between CIR value and predictive CIR value | <20 (dB).

In this embodiment, "the difference between the measured CIR value and the predictive CIR value" which indicates occurrence/non-occurrence of a variation in the communication environment is used as the reliability index. Therefore, the index can include information indicating whether the probability that disconnection of a communication will immediately occur in a state that the transmission or reception state is closed to a communication disconnection is high or low. The reason is as follows. When the communication state of an upstream channel or a downstream channel is closed to a communication disconnection, the probability of occurrence of a communication disconnection is high if the variation of the communication state is large and the probability is low and the communication state is continued if the variation of the communication state is small.

Fourth Embodiment

As is the case of the above embodiments, a fourth embodiment relates to a communication system using the EV-DO system in which communication quality indices of a terminal apparatus of the EV-DO system are displayed. In this embodiment, a communication quality index of the upstream channel (upstream channel communication quality index) and a communication quality index of the downstream channel (downstream channel communication quality index) are displayed separately. The upstream channel communication quality index is derived on the basis of the difference between a maximum transmissible power value of the terminal apparatus and a current transmission power value of the terminal apparatus. On the other hand, the downstream channel communication quality index is derived by correcting a communication rate predicted on the basis of a DRC with using "the difference between a minimum receivable power value of the terminal apparatus and a current reception power value of the terminal apparatus". The correction method is such that "the communication quality index" is given a minimum value when "the difference between the minimum receivable power value of the terminal apparatus and the current reception power value of the terminal apparatus" becomes 0.

The terminal apparatus 18 shown in FIG. 2 is also effective in the fourth embodiment.

Figure 9:
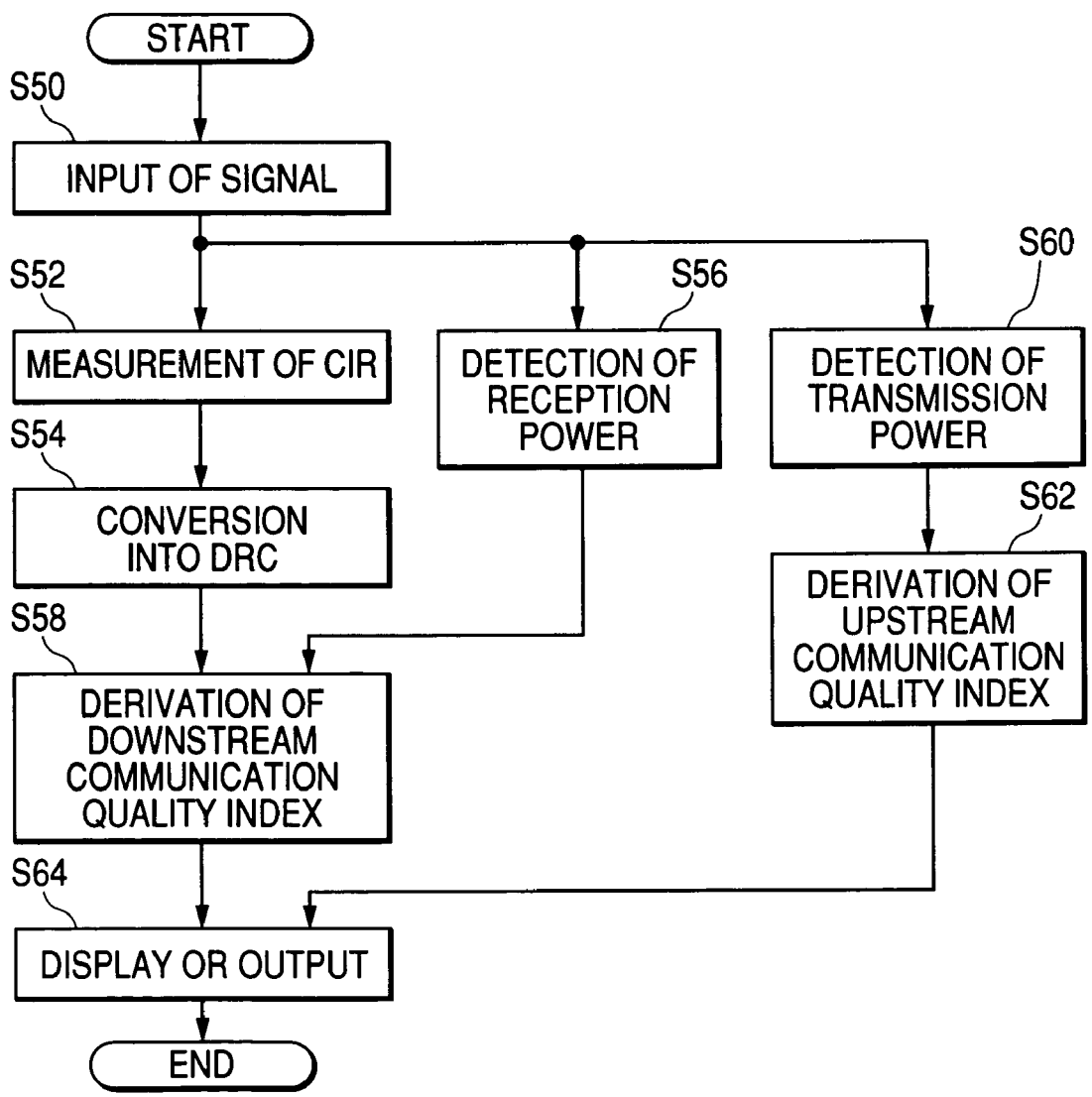
FIG. 9 is a flowchart of a process of deriving communication quality indices according to a fourth embodiment of the invention.

FIG. 9 is a flowchart of a process for deriving communication quality indices of the fourth embodiment. A signal is input to the demodulator 42 and then to the decoder 46 shown in FIG. 2 (S50). The decoder 46 derives a CIR value 204, and the predictor 48 derives a next CIR value 208 (S52). The next CIR value 208 is converted into a DRC 210 with using the CIR-DRC conversion table 50 (S54). The demodulator 42 detects a reception power value 206 (S56). The CPU 26 employs, as a communication quality index for the downstream channel 60, a communication rate (38.4 kbps to 2,457.6 kbps) itself that is determined from the DRC 210 if "the difference between the reception power value 206 and a minimum receivable power value" is greater than a predetermined threshold value. If the difference is smaller than the threshold value, the CPU 26 employs the following value as a communication quality index for the downstream channel 60 (S58).

[downstream communication rate index]=[communication rate corresponding to DRC]×[reception power value−minimum receivable power value]/ 10.

The unit of the communication quality index for the downstream channel 60 is bps. Alternatively, where the next CIR value 208 is used as the communication quality index of the downstream channel 60, assuming that the minimum value of the CIR is assumed to be −15 dB, the CPU 26 employs, as a communication quality index for the downstream channel 60, the next CIR value 208 itself if "the difference between the reception power value 206 and the minimum receivable power value" is greater than a predetermined threshold value. If the difference is smaller than the threshold value, the CPU 26 employs the following value as a communication quality index for the downstream channel 60.

[downstream communication rate index]=(CIR+15)× [reception power value−minimum receivable power value]/10-15.

The unit of the communication quality index for the downstream channel 60 is dB.

The decoder 46 detects a transmission power value from power control information 202 (S60). The CPU 26 calculates a communication quality index for the upstream channel 62 on the basis of the power control information 202 (S62). The CPU 26 displays the downstream communication quality information and the upstream communication quality information on the display unit 30 or outputs those via the external 1F unit 34 (S64).

In this embodiment, "the difference between the reception power value and the minimum receivable power value" and the DRC or the CIR are used for generating the communication quality index for the downstream channel 60. Therefore, the index can reflect not only the predicted communication rate of the downstream channel 60 but also the probability of communication rate reduction due to a deteriorated communication state of the downstream channel 60. For example, at a location where is distant from the base station apparatus 12 and has no other nearby base station apparatus, the CIR is large because of absence of interference waves but the probability that the communication state of the downstream channel 60 rapidly deteriorates is high because the reception power value is close to the minimum receivable power value. These facts are reflected in the index. Further, since "the difference between the transmission power value and the maximum transmissible power value" is used as the upstream communication quality index, a communication disconnection can be predicted. Such a disconnection will occur when the transmission power value is close to the maximum transmissible power value even under an environment that the reception state at the terminal apparatus 18 is good and a high communication rate is expected because both of CIR and DRC are large. That is, the transmission power value will reach the maximum transmissible power value and, if the transmission power value is still insufficient, an upstream channel signal will not reach the base station apparatus 12.

Fifth Embodiment

In the above-described embodiments, the communication quality indices are displayed to allow the user to recognize the communication state. In a fifth embodiment, a terminal apparatus outputs a communication quality index to an application that is used on a predetermined network, and the application sets a communication rate etc. by referring to the communication quality index. Where an application as streaming video is used on a wireless communication network of the EV-DO system or the like, the communication rate on the wireless communication network is varied by various factors such as variation of the radio environment and occurrence of traffic of other users. It is therefore difficult to ensure a high communication rate that can be used for the streaming of the application.

When the application sends video with an assumption of a high communication rate, high image quality can be obtained if the assumed high communication rate is secured. However, if the actual communication rate is varied so as to be lower than the assumed communication rate, quality deterioration such as a lack of image information or a stop of a moving picture occurs. On the other hand, if video is sent with an assumption of a low communication rate in order to prepare for a variation in communication rate, only a low-quality moving picture can be obtained irrespective of an actual communication rate. A communication quality index that is derived in the terminal apparatus is used for setting a communication rate.

Figure 10:
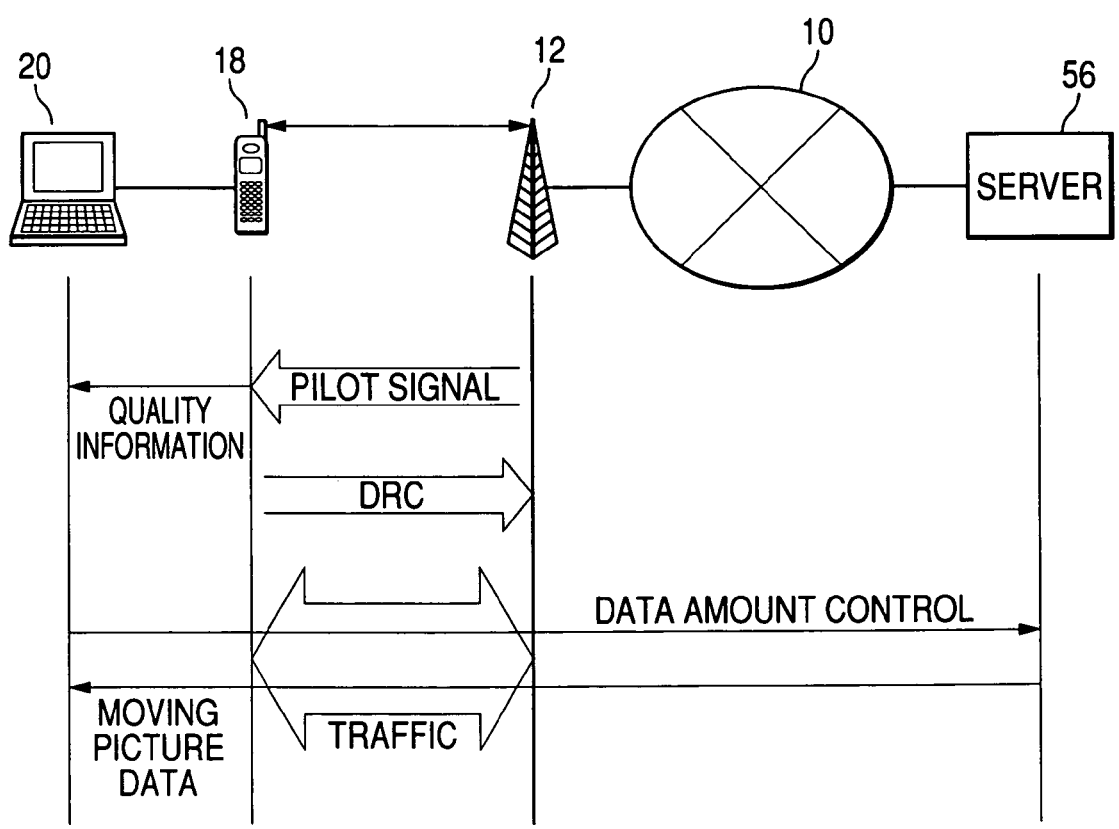
FIG. 10 shows the configuration of an application system according to a fifth embodiment of the invention.

FIG. 10 shows the configuration of an application system of this embodiment. As shown in FIG. 10, the application system includes a server 56 in addition to the configuration of the communication system 100 of FIG. 1. In this embodiment, the PC 20 operates an application client. The terminal apparatus 18 determines a DRC and quality information as a communication quality index on the basis of a received pilot signal transmitted from the base station apparatus 12, reception power and transmission power, and sends the DRC to the base station apparatus 12, and notify the quality information to the PC 20. The PC 20 estimates a communication rate that can be used on a traffic channel of the EV-DO system on the basis of various kinds of information such as the quality information, a free-area capacity of a reception buffer and an error rate of a reception data signal, and communicates the estimated communication rate to the server 56 via the terminal apparatus 18, the base station apparatus 12, and the network 10. The server 56 increases or decreases the communication rate of moving picture data it sends.

According to this embodiment, it is possible to use the communication quality index as a judgment reference of a QoS (Quality of Service) control by notifying the communication quality index to the PC 20 or an application on the network 10.

Sixth Embodiment

In this embodiment, a communication quality index is used as a parameter to be used for determining communication quality of the EV-DO system in a system which selects a communication system that is most suitable for an environment (hereinafter referred to as "seamless communication system"). In the seamless communication system, a composite terminal of the EV-DO system and the cdma2000 1x system and a plurality of communication systems are combined together.

Figure 11:
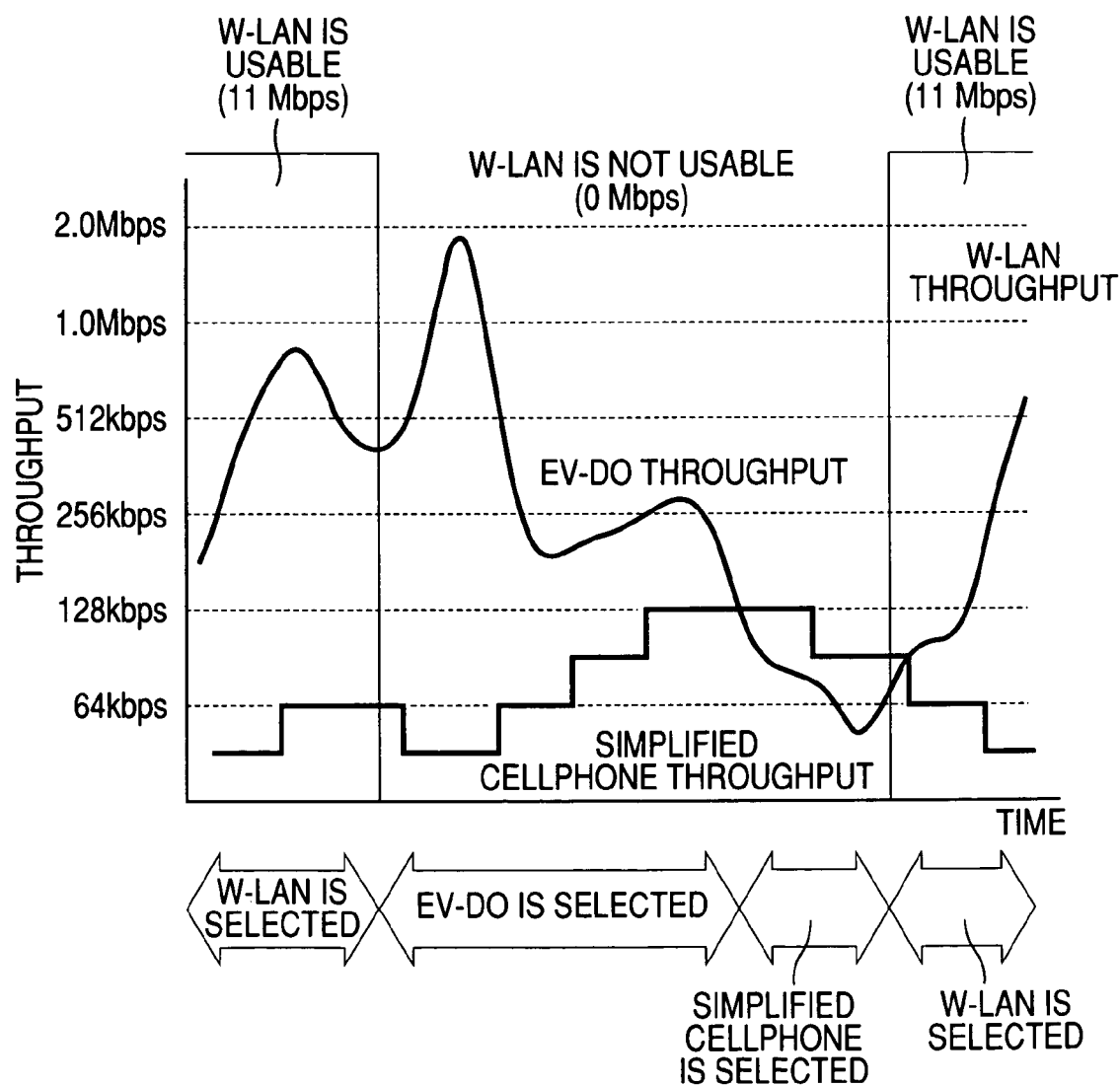
FIG. 11 shows an exemplary operation of selection among a plurality of systems according to a sixth embodiment of the invention.

FIG. 11 shows an exemplary operation of selection among a plurality of systems according of this embodiment. The plurality of systems are assumed to be the EV-DO system, a simplified cellular phone (PHS system defined in Japanese RCR-STD28), a W-LAN (wireless LAN, for example, IEEE 802.11a/b/g). The horizontal axis represents time, and the vertical axis represents the throughput of each system. For the W-LAN, the vertical axis merely represents "usable" and "unusable." Specifically, a control is performed in such a manner that the simplified cellular phone is selected if the communication rate index of the EV-DO system is about 90 kbps, the reception electric field strength of the simplified cellular phone is expected to be about 128 kbps, and an out-of-range state is established for the W-LAN. If the environment has changed and the communication rate index of the EV-DO system has increased to about 200 kbps, switching is made to the EV-DO system.

Figure 12:
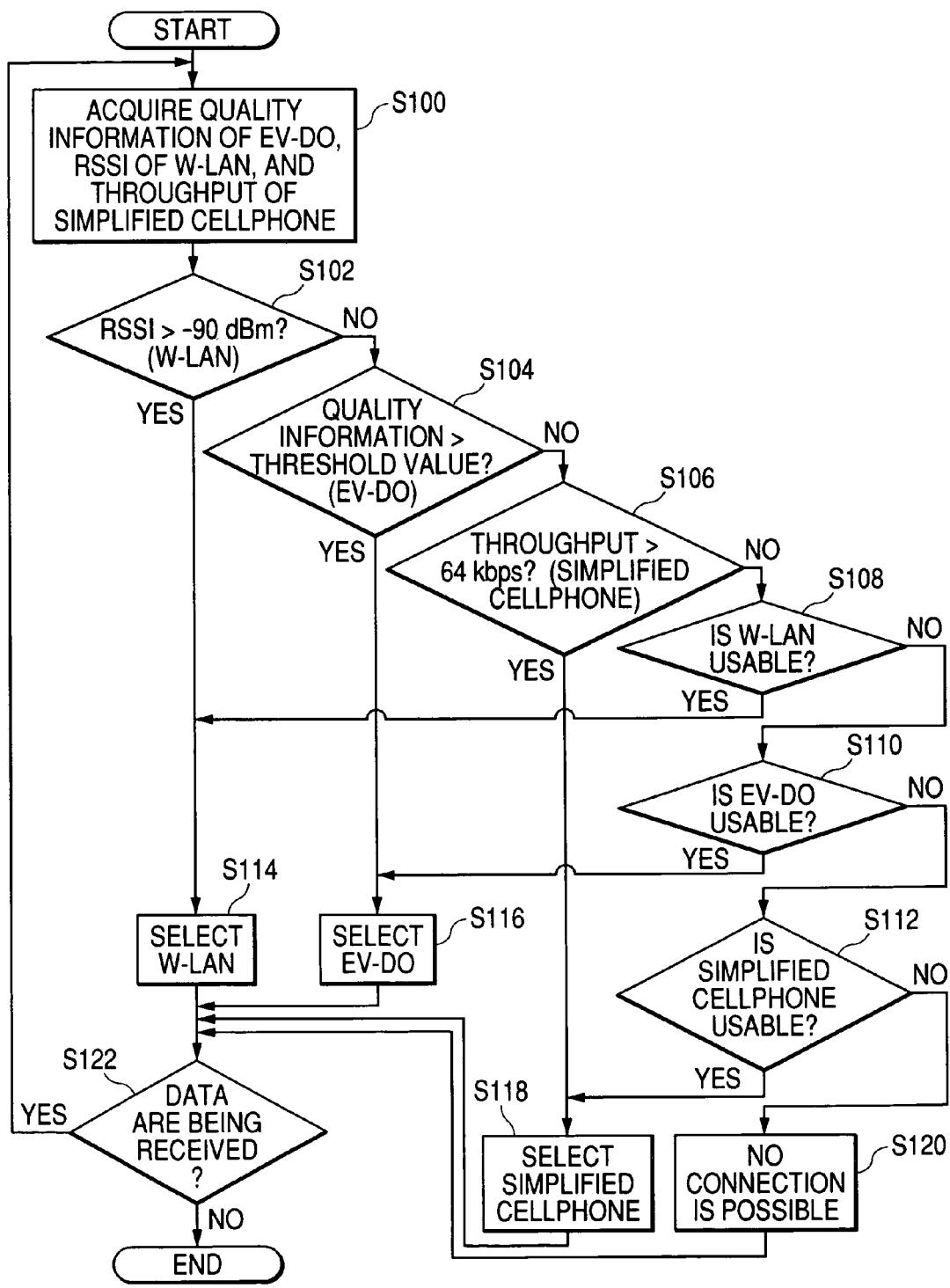
FIG. 12 is a flowchart of a process of selection among the plurality of systems of FIG. 11.

FIG. 12 is a flowchart of a process of selection among the plurality of systems. In this embodiment, the system selection is performed with the priority order that descends in the order of the W-LAN, the EV-DO system, and the simplified cellular phone. Quality information, an RSSI value, and a throughput are acquired for the W-LAN, the EV-DO system, and the simplified cellular phone, respectively (S100). If the RSSI value of the W-LAN is greater than −90 dBm (Y at S102), the W-LAN is selected (S114). If the RSSI value of the W-LAN is smaller than −90 dBm (N at S102) and the quality information of the EV-DO system is greater than a threshold value (Y at S104), the EV-DO system is selected (S116). If the quality information of the EV-DO system is smaller than the threshold value (N at S104) and the throughput of the simplified cellular phone is greater than 64 kbps (Y at S106), the simplified cellular phone is selected (S118).

If the throughput of the simplified cellular phone is smaller than 64 kbps (N at S106) and the W-LAN is usable (Y at S108), the W-LAN is selected (S114). If the W-LAN is not usable (N at S108) and the EV-DO system is usable (Y at S110), the EV-DO system is selected (3116). If the EV-DO system is not usable (N at S110) and the simplified cellular phone is usable (Y at S112), the simplified cellular phone is selected (S118). If the simplified cellular phone is not usable (N at S112), no connection is possible (S120). The execution of the above process is continued as long as data are received (Y at S122). The process is finished when the data reception is terminated (N at S122)

In this embodiment, it is possible to provide more correct selection criterion by using, in the case of the EV-DO system, the communication quality index as a reference for the system selection of the seamless communication system.

The first to sixth embodiments of the invention have been described above. However, the embodiments are just examples, and it is apparent to a person skilled in the art that the combination of components or the processing steps can be modified in various manners and those modifications are covered by the scope of the invention.

In the first to third embodiments, the CPU 26 calculates the reliability index on the basis of the transmission power value etc. as one of communication quality indices. However, the invention is not limited to such a case; a communication quality index may be generated by combining values that are calculated on the basis of various power values. For example, a new reliability index may be generated by combining the reliability index corresponding to the transmission power value and time reliability index corresponding to the reception power value. A communication rate index as corrected by using the predictive CIR value may be used as a new communication rate index. The former modification makes it possible to predict a communication disconnection, that is, an event that the terminal apparatus 18 cannot receive a signal sent from the base station apparatus 12 on the downstream channel 60, in the case where because of asymmetry of the radio transmission environments of the upstream channel 62 and the downstream channel 60 the intensity of a downstream channel signal is close to a lower limit though the difference between the current transmission power value and the maximum transmission power value of the upstream channel 62 is large. The latter modification allows the index to reflect whether the probability that a communication disconnection will occur in a state that the transmission or reception state is close to a communication disconnection is high or low.

Further, the new reliability index that is generated by combining the reliability index corresponding to the transmission power value and the reliability index corresponding to the reception power value may be corrected so as to reflect a variation of the communication environment. For example, the difference between a minimum value and a maximum value of short-term (e.g., 20 ms) average values of CIR values or reception power values in a longer period (e.g., 1 s) is calculated and the variation of the communication environment is considered larger when the calculated difference is larger. Where the reliability index is corrected by using the difference between the minimum value and the maximum value of short-term (20 ms) average values of CIR values in 1 second, the correction value is set to 10 if the difference between the minimum value and the maximum value is greater than 10 dB and is set to the difference itself if the difference is smaller than 10 dB. On the other hand, the correction value is set to 10 if the difference between the minimum value and the maximum value of short-term average values of reception power values is greater than 20 dB and is set to ½ times the difference if the difference is smaller than 20 dB. This modification makes it possible to display the communication quality indices in more detail.

In the first embodiment, the display unit 30 displays the antenna bars 300 and the icon 302 as the communication rate index and the reliability index, respectively. However, the manner of display of the display unit 30 is not limited to the above. The communication rate index may be displayed in the form of a numeral representing a communication rate, or the user may be informed of the communication rate index in the form of vibration of the like. This modification allows the user to recognize the content of display of the display unit 30 more clearly.

Displaying both of the communication rate index and the reliability index allows the user to recognize the communication state more surely. A more reliable communication rate can be display by correcting the communication rate index using the reliability index.

Seventh Embodiment

A seventh embodiment relates to a communication system using the above-described cdma2000 1xEV-DO system in which communication quality index is displayed to notify the user of a communication state. In this embodiment, a communication rate index as the communication quality index is derived from a corrected CIR that is obtained by correcting a downstream channel CIR corresponding to a DRC using a correction value. The correction value is derived from the difference between a maximum transmissible power value of a terminal apparatus and a current transmission power value of the terminal apparatus. When the current transmission power value of the terminal apparatus is equal to the maximum transmissible power value, the terminal apparatus cannot increase the transmission power even if the terminal apparatus was instructed to increase the transmission power by a base station apparatus. Therefore, the base station apparatus cannot obtain a necessary reception power, so that a communication on an upstream channel becomes more prone to be disconnected. Although the use of the current CIR enables a communication at a high communication rate, the probability of disconnection of a communication on an upstream channel is high. In view of this, the user is notified of the communication rate index that is generated with a future communication rate reduction taken into consideration. As a result, the user can recognize a communication state more surely.

Figure 13:
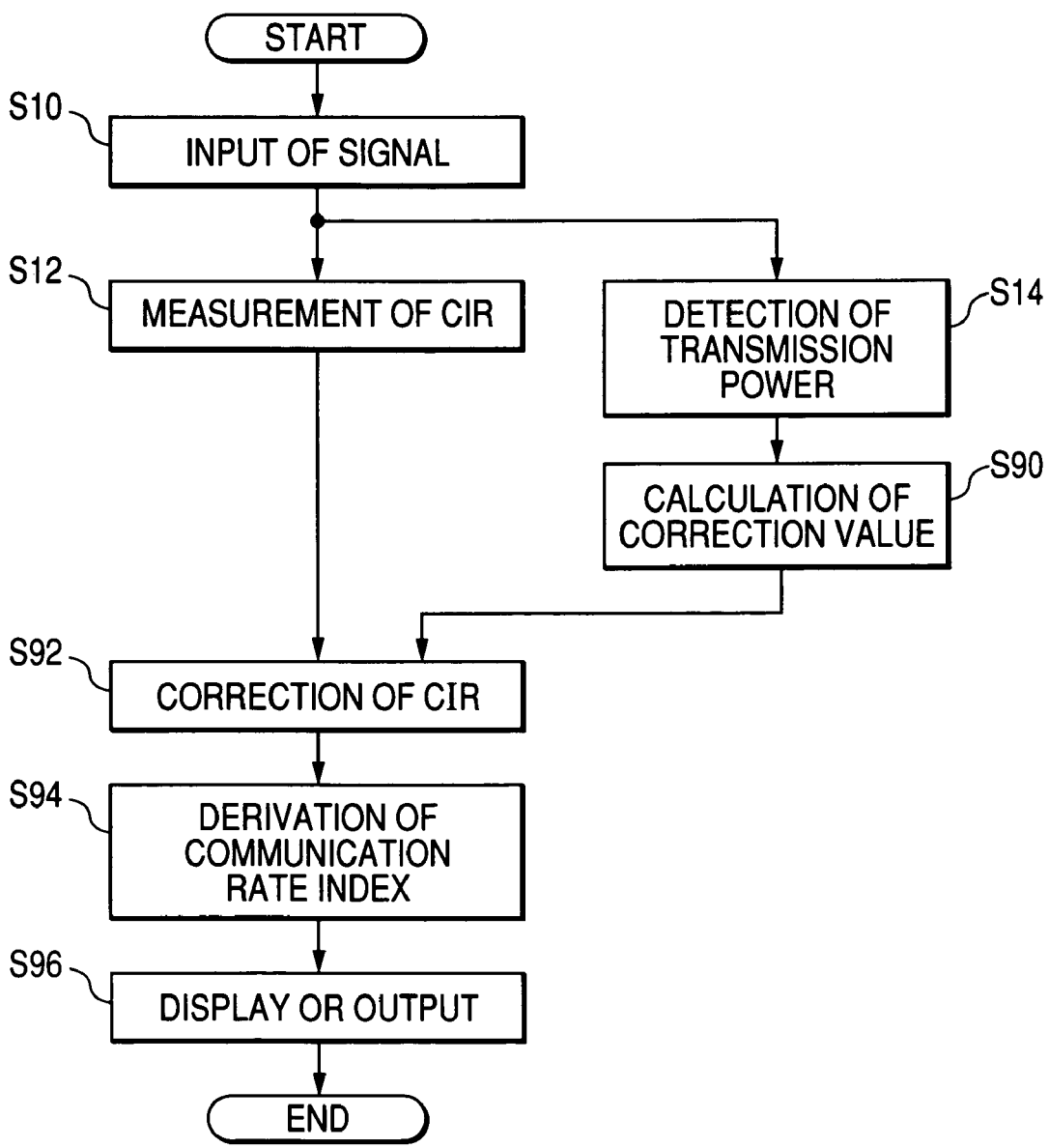
FIG. 13 is a flowchart of a process of deriving a communication rate index according to a seventh embodiment of the invention.

FIG. 13 is a flowchart of a process for deriving the communication rate index as the communication quality index. A signal is input to the demodulator 42 and then to the decoder 46 shown in FIG. 2 (S10). The decoder 46 derives a CIR value 204, and the predictor 48 derives a next CIR value 208 (S12). That is, the predictor 48 calculates a next CIR value 208 by predicting a CIR of the next reception time slot on the basis of the CIR value 204. The next CIR value 208 is converted into a DRC 210 with using the CIR-DRC conversion table 50. The decoder 46 detects power control information 202 (S14). A CPU 126 corrects a current transmission power value with using the power control information 202 to derive a transmission power value. The CPU 126 calculates a correction value on the basis of the difference (unit: dB) between the transmission power value (unit: dBm) and a maximum transmissible power value (unit: dBm) or a converted value obtained on the basis of the difference (S90). Specifically, the correction value is set to 0 if the difference between the transmission power value (unit: dBm) and the maximum transmissible power value is greater than 10 dB, and is calculated in the following manner if the difference is smaller than 10 dB.

[correction value]=(−2)×{10−([transmission power value]−[maximum transmissible power value])}

The unit of the correction value is dB. The correction value may be derived from the transmission power value according to a table shown in FIG. 14 instead of calculating it. After calculating the correction value, the CPU 126 corrects the next CIR value by using the correction value (S92) in the following manner.

[corrected CIR value]=[next CIR value]×[correction value]

The unit of the corrected CIR value is dB. The CPU 126 derives a communication rate index from the corrected CIR value (S94). Where the unit of the communication rate index is bps, this is performed with using a CIR-DRC conversion table 150 shown in FIG. 14.

The CPU 126 displays the communication rate index on the display unit 30, or outputs it via the external 1F unit 34 (S96). FIGS. 15A and 15B show display on the display unit 30. Antenna bars 300 and a rate indicator 302 indicate the communication rate index. The rate indicator 302 is displayed as a numeral in FIG. 15A and as a graph in FIG. 15B. Alternatively, the user may be notified of the communication rate index by using LED lighting patterns shown in FIG. 16. Flashing (1) and flashing (2) are different from each other in that the on-duty factor is larger in flashing (2).

According to this embodiment, it is possible to directly increase the accuracy of the communication rate because the communication rate index is calculated on the basis of a corrected value of a measured downstream channel CIR. Further, since "the difference between the transmission power value and the maximum transmissible power value" is used for deriving the correction value, disconnection of a communication can be previously predicted. Such a disconnection may occur when the transmission power value is close to the maximum transmissible power value even under an environment that the reception state at the terminal apparatus 18 is good and a high communication rate is expected because both of CIR and DRC are large. That is, the transmission power value will reach the maximum transmissible power value and, if the transmission power value is still insufficient, an upstream channel signal will not reach the base station apparatus 12.

Eighth Embodiment

As is the case of the seventh embodiment, an eighth embodiment relates to a communication system using the EV-DO system in which a communication rate index based on a corrected CIR as a communication quality index. Whereas the correction value is derived from a transmission power value in the seventh embodiment, it is derived on the basis of the difference between a minimum receivable power value and a current reception power value of the terminal apparatus in the eighth embodiment. The communication rate depends on the CIR and is not influenced by the reception power value in an AGC operating range of the terminal apparatus. However, if the reception power value becomes lower than the AGC operating range, the CIR steeply decreases. Therefore, a communication on a downstream channel becomes more prone to be disconnected. That is, although the use of the current CIR enables a communication at a high communication rate, the probability of disconnection of a communication on an upstream channel is high. In view of this, the user is notified of the communication rate index that is generated with a future communication rate reduction taken into consideration.

The terminal apparatus 18 shown in FIG. 2 is effective as a terminal apparatus 118 of the eighth embodiment. The flowchart of FIG. 13 is effective as a flowchart of a process of deriving a communication rate index of the eighth embodiment except S54 and S56. At a step corresponding to S54, the demodulator 42 detects a reception power value 206. At a step corresponding to S56, the CPU 126 calculates a correction value on the basis of the difference (unit: dB) between the reception power value 206 (unit: dBm) and a minimum receivable power value (unit: dBm) or a converted value of the difference. Specifically, the correction value is set to 0 if the difference between the minimum receivable power value (assumed to be −104 dBm) and the reception power value 206 is greater than 10 dB, and is calculated in the following manner if the difference is smaller than 10 dB.

[correction value]=10−[reception power value−minimum receivable power value]

The correction value may be derived from the reception power value 206 with using a table shown in FIG. 17 instead of calculating it.

According to this embodiment, since the difference between the reception power value and the minimum receivable power value is used to derive the correction value, disconnection of a communication can be previously reflected to the communication rate index. Such a disconnection may occur when the intensity of a downstream channel signal sent from the base station apparatus 12 is close to a reception lower limit though the CIR of the downstream channel 60 is large and the downstream channel signal cannot be received by the terminal apparatus 118. Further, since the transmission power value is not used, this embodiment can also be applied to a case that the terminal apparatus 118 is not sending a signal though it is receiving a signal from the base station apparatus 12.

In the seventh embodiment, the CPU 126 calculates the correction value of the communication rate index on the basis of the transmission power value. In the eighth embodiment, the CPU 126 calculates the correction value on the basis of the reception power value 206. However, the manner of calculation of the correction value is not limited to the above. For example, the correction based on the transmission power value 212 and the correction based on the reception power value 206 may be performed simultaneously. This modification can accommodate a case that the transmission power value 212 and the reception power value 206 are not in one-to-one correspondence because of a transmission power control for the upstream channel 62 and hence communication quality deterioration that may occur when the reception power value of the downstream channel 60 comes close to the minimum receivable power value and communication quality deterioration that may occur when the transmission power value of the upstream channel 62 comes close to the maximum transmission power value do not occur simultaneously.

In the seventh embodiment, the display unit 30 displays the antenna bars 300 and the rate indicator 302 as the communication rate index. However, the manner of display of the display unit 30 is not limited to the above. Only the antenna bars 300 may be displayed (i.e., the rate indicator 302 is omitted). The reception power value may be indicated by antenna bars 300. Further, the user may be informed of the communication rate index in the form of vibration of the like. This modification allows the user to recognize the content of display of the display unit 30 more clearly.

Ninth Embodiment

A ninth embodiment relates to a communication system using the above-described cdma2000 1xEV-10 system in which communication quality index is displayed to notify the user of a communication state. In this embodiment, a communication rate index as the communication quality index is derived from a corrected CIR that is obtained by correcting a downstream channel CIR corresponding to a DRC using a correction value. For the correction value to reflect a signal occupation ratio, the correction value is derived from a communication rate that a terminal apparatus requested the base station apparatus during a communication and an actual amount of data that have been transmitted from the base station apparatus to the terminal apparatus.

When the amount of transmitted data is close to a value corresponding to the requested communication rate, that is, when the occupation ratio of signals directed to a subject terminal apparatus is high and the degree of congestion of channels as subjects of scheduling of the base station apparatus is low, the terminal apparatus can continues to receive data whose amount is close to the value corresponding to the requested communication rate. On the other hand, when the amount of transmitted data is smaller than the value corresponding to the requested communication rate, that is, when the occupation ratio of signals directed to the subject terminal apparatus is low and the degree of congestion of channels as subjects of scheduling of the base station apparatus is high, it is difficult for the terminal apparatus to receive data in an amount that is close to the value corresponding to the requested communication rate. In view of the above, the user is notified of the communication rate index that reflects the traffic of each of the other terminal apparatus connected to the base station apparatus. This allows the user to recognize a communication state more surely.

Figure 18:
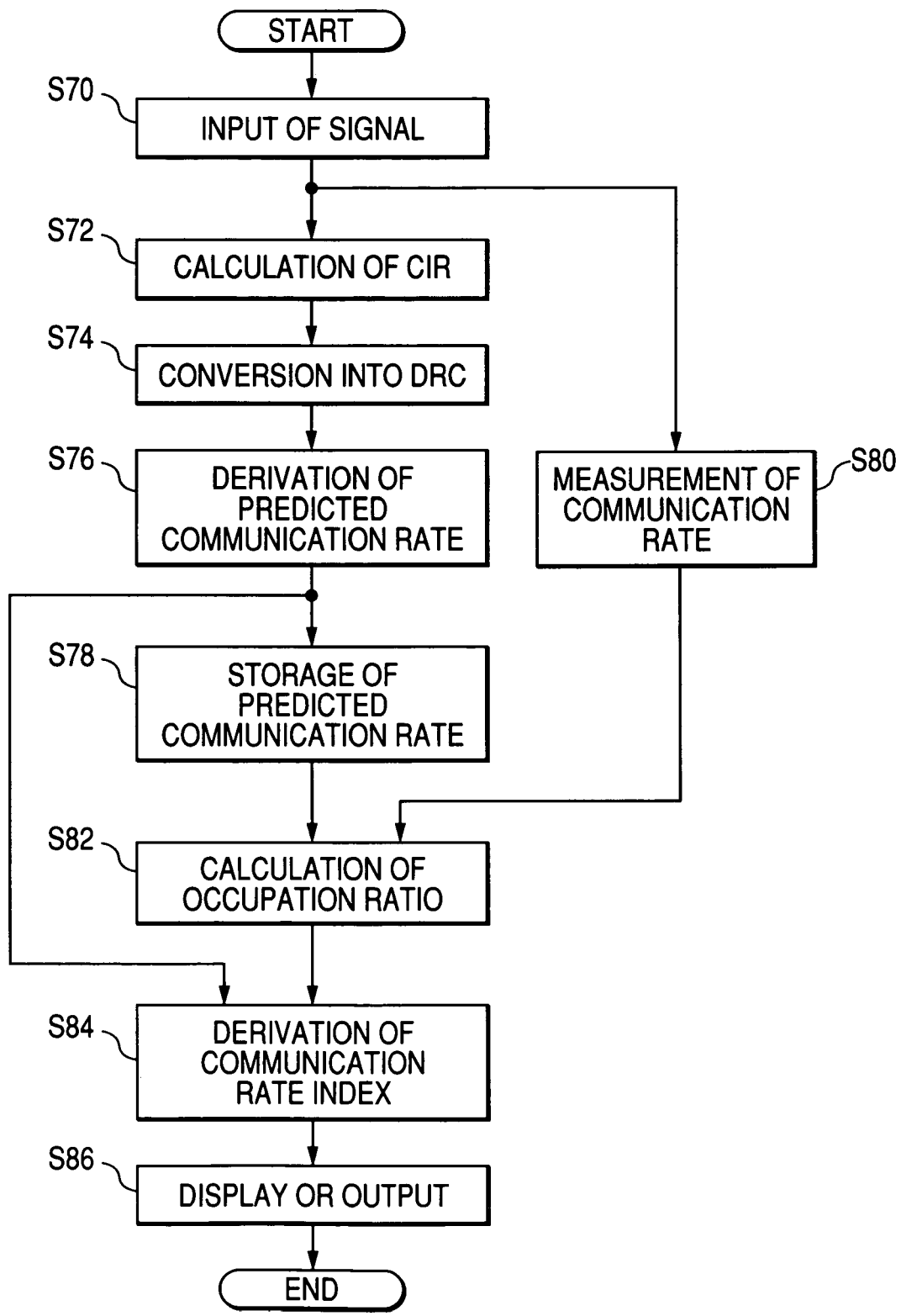
FIG. 18 is a flowchart of a process of deriving a communication rate index according to a ninth embodiment of the invention.

FIG. 18 is a flowchart of a process for deriving the communication rate index as the communication quality index. A signal is input to the demodulator 42 and then to the decoder 46 shown in FIG. 2 (S70). The decoder 46 derives a CIR value 204, and the predictor 48 derives a next CIR value 208 (S72). That is, the predictor 48 calculates a next CIR value 208 by predicting a CIR of the next reception time slot on the basis of the CIR value 204. The next CIR value 208 is converted into a DRC 210 with using the CIR-DRC conversion table 50 (S74). A CPU 226 derives a predicted communication rate from the DRC 210 (S76) and stores it in the memory 28 (S78). The predicted communication rate is stored in the memory 28 until reception of a signal (i.e., slot) corresponding to a DRC that was sent to the base station apparatus 12. The relationship between the transmission timing of a DRC and the reception timing of a corresponding signal (i.e., slot) is defined in ARIB STD C.S0024

The CPU 226 measures a communication rate of the received signal (S80). In this embodiment, the number of signals (slots) that are received in a predetermined period. Further, the CPU 226 calculates a slot occupation ratio (S82). Specifically, it is judged whether, as a result of scheduling processing of the base station apparatus 12, a signal will be received on the downstream channel 60 at a requested communication rate in a corresponding slot in response to a DRC that was requested by a subject terminal apparatus 218 in the past. An input D is set to 1 is such a signal is received, and is set to 0 if no such signal is received. A slot ratio (hereinafter referred to as "slot occupation rate") RS of a slot with which data are transmitted from the base station apparatus 12 to the terminal apparatus 218 in response to a DRC request is calculated in the following manner.

$$RS(t)=RS(t-1)\times(1-\mu)+D\times\mu$$

where RS(t) is the slot occupation ratio that has been updated by the slot concerned, RS(t−1) is the slat occupation ratio of the preceding slot, and μ is an update rate coefficient and is set to 0.01, for example. The initial value of RS may be an arbitrary value of 0 to 1 and is set to 0.5, for example.

In the EV-DO system, the relationship between the DRC and rate, the packet length/the number of slots is predetermined as shown in FIG. 19. The term "packet" means the unit of information that is transmitted on a communication channel of the downstream channel 60. For example, when DRC=0×1 and the communication rate is 38.4 kbps, a packet is transmitted by using a maximum of 16 slots. Therefore, when a packet of 38.4 kbps is assigned to the terminal apparatus 218, no DRCs corresponding to the 15 reception slots excluding the head slat are transmitted. However, the above-mentioned slot occupation ratio is calculated as if DRCs had also been transmitted for slots for which no corresponding slots were actually transmitted. The CPU 226 calculates a communication rate index value in the following manner on the basis of the slot occupation ratio (S84)

[communication rate index value]=[communication rate corresponding to DRC]×[slot occupation ratio]

The unit of the communication rate index value is bps. Since this index value is obtained every slot, that is, 600 times per second, index values may be subjected to necessary processing such as averaging at a frequency that is suitable for an update rate that is required for display to the user, sending of a notice to an application, or a like purpose. For example, an average is calculated every 600 slots.

Alternatively, the slot occupation ratio RS may be calculated more simply every predetermined time in such a manner that the CPU 226 counts the number of times of data reception (data are or are not received for each slot).

RS(t)=[number of data reception slots]/(number of data reception slots+number of data non-reception slots)

For example, if 150 among the 600 slots included in one second are data reception slots, the slot occupation ratio amounts to 0.25. Therefore, if the DRC of a slot concerned is 0× Or (1,228.8 kbps), the communication rate index value is calculated as 307.2 kbps.

As is the case of the seventh embodiment, the CPU 226 displays the communication rate indication value on the display unit 30, or outputs it via the external IF unit 34 (S86). The display picture of the display unit 30 is the same as shown in FIG. 15A or 15B. That is, the communication rate index is indicated by the antenna bars 300 and the rate indicator 302. Alternatively, as is the case of the seventh embodiment, the user may be notified of the communication rate index with using LED lighting patterns shown in FIG. 16.

In the embodiment, the communication rate obtained from the DRC that is based on the CIR corresponds to the upper limit of the downstream channel communication rate in a case that the other terminal apparatus in a sector perform no communications and the terminal apparatus can occupy all the downstream channel communication resources of the sector. According to this embodiment, since the communication rate index is derived by multiplying the upper limit of the downstream channel communication rate by the slot occupation ratio as described above, the accuracy of the communication rate index can be increased. Since the slot occupation ratio which is a parameter of the communication rate index and communication rate based on the DRC are determined individually, this embodiment can accommodate a case that the DRC varies because the terminal apparatus moves and the reception state varies accordingly and a case that the slot occupation ratio varies because the number of the other terminal apparatus varies.

Although the CPU 226 calculates the communication rate index value by using the slot occupation ratio in the ninth embodiment, the invention is not limited to such a case. For example, a packet occupation ratio may be used. As a further alternative, switching may be made between the slot occupation ratio and the packet occupation ratio according to a scheduling algorithm of the base station apparatus 12. This modification is effective in the case where the number of packets, rather than the number of slots, is employed as a reference of fairness when the base station apparatus 12 assigns part of the communication resources of the downstream channel 60 to a terminal apparatus 218 in the sector. In particular, in the case of a proportional fair algorithm, fairness is attained in terms of the number of packets in the case where the terminal apparatus 218 sends a constant DRC.

Although the communication 100 system employs the EV-DO system in the ninth embodiment, the invention can be applied to any wireless communication systems in which the communication rate of the downstream channel 60 is controlled so as to vary to a large extent depending on the signal reception state of the terminal apparatus 218 and communication channels of the downstream channel 60 are assigned to a plurality of terminal apparatus 218 by time division multiplexing. In particular, in such a wireless communication system, the communication rate index according to this embodiment can be used in a terminal apparatus 218 capable of recognizing whether a request for assignment of a communication channel of the downstream channel 60 has been sent and whether corresponding communication channel assignment has been made actually.

In the ninth embodiment, the display unit 30 displays the antenna bars 300 and the rate indicator 302 as the communication rate index. However, the manner of display of the display unit 30 is not limited to the above. Only the antenna bars 300 may be displayed (i.e., the rate indicator 302 is omitted). The reception power value may be indicated by antenna bars 300. Further, the user may be informed of the communication rate index in the form of vibration of the like. This modification allows the user to recognize the content of display of the display unit 30 more clearly.

According to the above embodiments, it is possible to notify the user of an index of communication quality. Although the CIR is utilized in order to derive the communication quality in the above embodiments, a total-desired power ratio (power ratio of desired signal to total received signal) or a desired-interference power ratio (power ratio of interference component to desired signal component) may be utilized instead of the CIR value.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A radio apparatus comprising:
   a receiving unit for receiving a signal transmitted from a base station apparatus at a variable communication rate;
   a measuring unit for measuring a quality of the received signal;
   an estimating unit for deriving a first prediction value of a communication rate of a signal being transmitted from the base station apparatus in the future, based on the quality of the received signal being previously measured by the measuring unit;
   an index calculating unit for calculating an index value based on the newly measured quality of the received signal at next timing;
   a calculating unit for calculating a second prediction value of the communication rate based on the index value and the first prediction value; and
   a notifying unit for notifying the second prediction value.

2. The radio apparatus according to claim 1, wherein the quality of the received signal is characterized by a carrier-to-interference power ratio.

3. A radio apparatus comprising:
   a receiving unit for receiving a signal transmitted from a base station apparatus at a variable communication rate;
   a measuring unit for measuring a quality of the received signal;
   an estimating unit for deriving a first prediction value of a communication rate of a signal being transmitted from the base station apparatus in future, based on the quality of the received signal being previously measured by the measuring unit;
   a detecting unit for detecting a power value based on the received signal;
   a power index calculating unit for calculating an index value based on a preset reference value and the detected power value;

a calculating unit for calculating a second prediction value of the communication rate based on the index value and the first prediction value; and a notifying unit for notifying the second prediction value.

4. The radio apparatus according to claim 3, wherein the quality of the received signal is characterized by a carrier-to-interference power ratio.

5. The radio apparatus according to claim 3, wherein the detecting unit detects a reception power value of the received signal as the power value, and the power index calculating unit sets a minimum receivable power value as the reference value and calculates the index value based on the minimum receivable power value and the reception power value.

6. The radio apparatus according to claim 3, wherein the detecting unit detects a transmission power value as the power value, which corresponds to an instruction information included in the received signal and is transmitted at next timing, and the power index calculating unit sets a maximum transmissible power value as the reference value and calculates the index value based on the maximum transmissible power value and the transmission power value.

7. A radio apparatus comprising:

a receiving unit for receiving a signal transmitted from a base station apparatus at a variable communication rate;

a measuring unit for measuring a quality of the received signal;

an estimating unit for deriving a first prediction value of a communication rate of a signal being transmitted from the base station apparatus in future, based on the quality of the received signal being previously measured by the measuring unit;

an index calculating unit for calculating a first index value based on the measured quality of the received signal;

a detecting unit for detecting a power value based on the received signal;

a power index calculating unit for calculating a second index value based on a preset reference value and the detected power value;

a calculating unit for calculating a second prediction value of the communication rate based on the second index value and the first prediction value; and a notifying unit for notifying the second prediction value.

8. The radio apparatus according to claim 7, wherein the quality of the received signal is characterized by a carrier-to-interference power ratio.

9. The radio apparatus according to claim 7, wherein the detecting unit detects a reception power value of the received signal as the power value, and the power index calculating unit sets a minimum receivable power value as the reference value and calculates the index value based on the minimum receivable power value and the reception power value.

10. The radio apparatus according to claim 7, wherein the detecting unit detects a transmission power value as the power value, which corresponds to an instruction information included in the received signal, and is transmitted at next timing, and the power index calculating unit sets a maximum transmissible power value as the reference value and calculates the index value based on the maximum transmissible power value and the transmission power value.

11. A radio apparatus comprising:

a receiving unit for receiving a signal transmitted from a base station apparatus at a variable communication rate;

a measuring unit for measuring a quality of the received signal;

an estimating unit for deriving a first prediction value of a communication rate of a signal being transmitted from the base station apparatus in the future, based on the quality of the received signal being previously measured by the measuring unit;

an index calculating unit for calculating a first index value based on the measured quality of the received signal;

a detecting unit for detecting a power value based on the received signal;

a power index calculating unit for calculating a second index value based on a preset reference value and the detected power value;

a calculating unit for calculating a second prediction value of the communication rate based on the first index value and the first prediction value; and a notifying unit for notifying the second prediction value.

12. The radio apparatus according to claim 11, wherein the quality of the received signal is characterized by a carrier-to-interference power ratio.

13. The radio apparatus according to claim 11, wherein the detecting unit detects a reception power value of the received signal as the power value, and the power index calculating unit sets a minimum receivable power value as the reference value and calculates the index value based on the minimum receivable power value and the reception power value.

14. The radio apparatus according to claim 11, wherein the detecting unit detects a transmission power value as the power value, which corresponds to an instruction information included in the received signal, and is transmitted at next timing, and the power index calculating unit sets a maximum transmissible power value as the reference value and calculates the index value based on the maximum transmissible power value and the transmission power value.

15. A radio apparatus comprising:

a receiving unit for receiving a signal transmitted from a base station apparatus at a variable communication rate;

a reception power detecting unit for detecting a reception power value of the received signal;

a first index calculating unit for calculating a first index value based on the detected reception power value and a minimum receivable power value;

a transmission power detecting unit for detecting a transmission power value, which corresponds to an instruction information included in the received signal and is transmitted at next timing;

a second index calculating unit for calculating a second index value based on the detected transmission power value and a maximum transmissible power value;

a measuring unit for measuring a quality of the received signal;

an estimating unit for deriving a first prediction value of a communication rate of a signal being transmitted from the base station apparatus in the future, based on the measured quality of the received signal;

a calculating unit for calculating a second prediction value of the communication rate based on the first index value and the first prediction value; and a notifying unit for notifying the second prediction value.

16. The radio apparatus according to claim 15, wherein the quality of the received signal is characterized by a carrier-to-interference power ratio.

17. A radio apparatus by comprising:
a receiving unit for receiving a signal transmitted from a base station apparatus at a variable communication rate;
a reception power detecting unit for detecting a reception power value of the received signal;
a first index calculating unit for calculating a first index value based on the detected reception power value and a minimum receivable power value;
a transmission power detecting unit for detecting a transmission power value which corresponds to an instruction information included in the received signal and is transmitted at next timing;
a second index calculating unit for calculating a second index value based on the detected transmission power value and a maximum transmissible power value;
a measuring unit for measuring a quality of the received signal;
an estimating unit for deriving a first prediction value of a communication rate of a signal being transmitted from the base station apparatus in the future, based on the measured quality of the received signal;
a calculating unit for calculating a second prediction value of the communication rate based on the second index value and the first prediction value; and
a notifying unit for notifying the first index value and the second prediction value.

18. The radio apparatus according to claim 17, wherein the quality of the received signal is characterized by a carrier-to-interference power ratio.

19. A radio apparatus comprising:
a receiving unit for receiving a signal transmitted from a base station apparatus;
a measuring unit for measuring a quality of the received signal;
a detecting unit for detecting a power value based on the received signal;
a calculating unit for calculating a correction value based on a preset reference value and the detected power value;
a correcting unit for correcting the measured quality of the received signal by using the calculated correction value;
wherein the signal transmitted from the base station apparatus includes an instruction information relating to a transmission power when the radio apparatus transmits a signal to the base station apparatus;
wherein the detecting unit detects a transmission power value of a signal to be transmitted as a predetermined power value, which corresponds to the instruction information relating to the transmission power included in the received signal and is transmitted at next timing; and
wherein the calculating unit sets a maximum transmissible power value as the reference value and calculates the correction value based on the maximum transmissible power value and the transmission power value of the signal to be transmitted.

20. A radio apparatus comprising:
a receiving unit for receiving a signal transmitted from a base station apparatus;
a measuring unit for measuring a quality of the received signal;
a detecting unit for detecting a power value based on the received signal;
a calculating unit for calculating a correction value based on a preset reference value and the detected power value;
a correcting unit for correcting the measured quality of the received signal by using the calculated correction value;
wherein the detecting unit detects a reception power value of the received signal as the predetermined power value; and
wherein the calculating unit sets a minimum receivable power value as the reference value and calculates the correction value based on the minimum receivable power value and the reception power value of the received signal.

21. A radio apparatus comprising:
a receiving unit for receiving a signal transmitted from a base station apparatus at a variable communication rate;
an interference measuring unit for measuring a quality of the received signal;
an estimating unit for deriving a prediction value of a communication rate of a signal being transmitted from the base station apparatus in the future, based on the measured quality of the received signal;
a storing unit for storing the prediction value;
a rate measuring unit for measuring an actual communication rate value of the received signal;
a calculating unit for calculating a signal occupation ratio based on the measured actual communication rate value and a prediction value corresponding to the measured actual communication rate value among prediction values stored in the storing unit; and
a correcting unit for correcting the prediction value by using the signal occupation ratio.

22. The radio apparatus according to claim 21, wherein the calculating unit calculates the signal occupation ratio by performing statistical processing to determine a ratio between the measured actual communication rate value and a prediction value corresponding to the measured actual communication rate value among prediction values stored in the storing unit in a past predetermined period.

23. The radio apparatus according to claim 21, wherein the correcting unit corrects the prediction value by multiplying the prediction value by the signal occupation ratio.

24. The radio apparatus according to claim 21, further comprising a notifying unit for notifying a user of the corrected prediction value.

25. The radio apparatus according to claim 21, further comprising an output unit for outputting the corrected prediction value.

26. The radio apparatus according to claim 21, wherein the quality of the received signal is characterized by a carrier-to-interference power ratio.

* * * * *